US008688850B2

(12) United States Patent
Branson et al.

(10) Patent No.: US 8,688,850 B2
(45) Date of Patent: Apr. 1, 2014

(54) METHOD FOR INTER-SITE DATA STREAM TRANSFER IN COOPERATIVE DATA STREAM PROCESSING

(75) Inventors: Michael J. Branson, Rochester, MN (US); Frederick Douglis, Basking Ridge, NJ (US); Zhen Liu, Tarrytown, NY (US); Fan Ye, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 11/747,694

(22) Filed: May 11, 2007

(65) Prior Publication Data
US 2008/0256166 A1 Oct. 16, 2008

Related U.S. Application Data

(63) Continuation-in-part of application No. 11/733,684, filed on Apr. 10, 2007, now Pat. No. 8,359,347, and a continuation-in-part of application No. 11/733,732, filed on Apr. 10, 2007, now Pat. No. 8,225,129, and a continuation-in-part of application No. 11/733,724, filed on Apr. 10, 2007, now Pat. No. 8,219,848.

(51) Int. Cl.
*G06F 17/30* (2006.01)

(52) U.S. Cl.
USPC .............. 709/231; 709/224; 718/18; 707/3

(58) Field of Classification Search
USPC .......................................................... 709/231
See application file for complete search history.

(56) References Cited

U.S. PATENT DOCUMENTS

| 5,758,359 | A | 5/1998 | Saxon |
| 6,151,304 | A | 11/2000 | Doshi et al. |
| 6,314,555 | B1 * | 11/2001 | Ndumu et al. ............... 717/101 |
| 6,363,421 | B2 * | 3/2002 | Barker et al. ............... 709/223 |
| 6,587,970 | B1 | 7/2003 | Wang et al. |
| 6,973,473 | B1 | 12/2005 | Novaes et al. |

(Continued)

OTHER PUBLICATIONS

Gavin Bong, Apache SOAP type mapping, Part 1: Exploring Apache's serialization APIs, 2002, IBM.*

(Continued)

*Primary Examiner* — Andrew Goldberg
(74) *Attorney, Agent, or Firm* — August Law, LLC

(57) ABSTRACT

A cooperative data stream processing system is provided that utilizes a plurality of independent, autonomous and potentially heterogeneous sites in a cooperative arrangement to process user-defined inquiries over dynamic, continuous streams of data. The system derives jobs from the inquiries and these jobs are executed on the various distributed sites by executing applications containing processing elements on these sites. Therefore, components of a given job can be executed simultaneously and in parallel on a plurality of sites within in the system. The sites associated with a given job execution have the need to share data, both primal and derived. A tunnel mechanism is provided that establishes tunnels between pairs of sites within the system. Each tunnel includes either a sink processing element on an originating site and a source processing element on a destination site or a gateway processing element on each site and a network connection between the sink and source processing elements. The sink and source processing elements are in communication with application processing elements on their respective sites and facilitate the exchange of data between these application processing elements. Tunnels can be establish on demand or in accordance with a prescribed plan and can be job specific of generic to any job executing on a given pair of sites.

17 Claims, 7 Drawing Sheets

(56) References Cited

U.S. PATENT DOCUMENTS

| | | | |
|---|---|---|---|
| 6,978,394 B1 | 12/2005 | Charny et al. | |
| 7,082,604 B2* | 7/2006 | Schneiderman | 718/100 |
| 7,554,921 B2 | 6/2009 | Previdi et al. | |
| 7,562,002 B2* | 7/2009 | Rzevski et al. | 703/22 |
| 7,861,246 B2* | 12/2010 | Lu et al. | 718/102 |
| 7,979,569 B2* | 7/2011 | Eisner et al. | 709/231 |
| 2002/0112196 A1 | 8/2002 | Datta et al. | |
| 2002/0188426 A1 | 12/2002 | Datta et al. | |
| 2003/0037133 A1 | 2/2003 | Owens | |
| 2004/0199811 A1 | 10/2004 | Rathunde et al. | |
| 2005/0076173 A1* | 4/2005 | Merril et al. | 711/100 |
| 2005/0271060 A1 | 12/2005 | Kodialam et al. | |
| 2006/0085428 A1 | 4/2006 | Bozeman et al. | |
| 2006/0090097 A1 | 4/2006 | Ngan et al. | |
| 2006/0112297 A1 | 5/2006 | Davidson | |
| 2006/0271815 A1 | 11/2006 | Mizuno et al. | |
| 2007/0174454 A1* | 7/2007 | Mitchell et al. | 709/225 |
| 2007/0299804 A1 | 12/2007 | Liu et al. | |
| 2008/0028008 A1 | 1/2008 | Brunet et al. | |
| 2008/0059554 A1* | 3/2008 | Dawson et al. | 709/201 |
| 2008/0077667 A1* | 3/2008 | Hwang et al. | 709/205 |
| 2008/0229142 A1 | 9/2008 | Anand et al. | |

OTHER PUBLICATIONS

Douglis et al., Multi-site Cooperative Data Stream Analysis, Jul. 6, 2006, pp. 31-37.*
Abadi et al., The Design of the Borealis Stream Processing Engine, 2005, pp. 1-13.*
Drougas et al., Load Balancing Techniques for Distributed Stream Processing Application in Overlay Environments, 2006, pp. 1-2.*
Daniel J. Abadi,etc,The Design of the Borealis Stream Processing Engine. CIDR 2005 Second Biennial Conference on Innovative Data Systems Research, 2005.
Daniel J. Abadi,etc,The Design of the Borealis Stream Processing Engine,Second Biennial Conference on Innovative Data Systems Research (CIDR 2005),Asilomar,CA,Jan. 2005.
Lisa Amini,Nevendu Jain,Anshul Sehgal,Jeremy Silber,Oliver Verscheure, Adaptive Control of Extreme-Scale Stream Processing Systems, Proceedings of ICDCS 2006, 2006.
Alain Andrieux,Karl Czajkowski,Asit Dan,Kate Keahey,Heiko Ludwig,Toshiyuki Nakata,Jim Pruyne,John Rofrano, Steve Tuecke,Ming Xu.Web Services Agreement Specification,Jul. 2006.
Magdalena Balazinska,Hari Balakrishnan,Samuel Madden,Mike Stonebraker.Fault-Tolerance in the Borealis Distributed Stream Processing System.ACM SIGMOD Conf.,Balto,MD Jun. 2005.
M.Balazinska,H. Balakrishnan,M. Stonebraker.Contract-Based Loas Management in Federated Distributed Systems.Symposium on Network System Design & Implementation.Mar. 2004.
D. Beckett.Rdf/xml syntax specification. http://www.w3.org/TR/rdf-syntax-grammar.
Ranjita Bhagwan,Fred Douglis,Kirsten Hildrum,Jeff Kephart,William Walsh.Time-varying Management of Data Storage.Flrst Workshop on Hot Topics in System Dependability,Jun. 2005.
S. Chandrasekaran,O.Cooper,A.Deshpande,M. Franklin,etcTelegraphCQ:Continuous Dataflow Processing for an Uncertain World.Conf. on Innovative Data Systems Research,2003.
F. Douglis,J.Palmer,E.Richards,D.Tao,Etc. Position:Short Object Lifetimes Require a Delete-Optimized Storage System.Proceedings 11th ACM SIGOPS European Workshop 2004.
Ian Foster, Carl Kesselman,Steven Tueke.The Anatomy of the Grid:Enabling Scalable Virtual Organizations.Lecture Notes in Computer Science,2150,2001.
Ian Foster,Carl Kesselman.Scaling System—Level Science:Scientific Exploration and IT Implications.IEEE Computer,39(11):31-39,2006.
Deepak Ganesan,B.Greensten,D.Perelyubskiy,D.Estrin,J. Heidmann.Multi-Resolution Storage and Search in Sensor Networks.ACN Transactions on Storage,Aug. 2005.
Jim Gray,Andreas Reuter.Transaction Processing:Concepts and Techniques.Morgan Kaufmann, 1992.
Theo Haerder,Andreas Reuter.Principles of Transaction-oriented Database Recovery. Readings in Database Systems(2nd ed.)pp. 227-242.Morgan Kaufmann Pub.,San Francsico,CA, 1994.
Jeong Hwang,M.Balazinska,A.Rasin,etc.High Availablity Algoritms for Distributed Stream Processing.21st International Conf. on Data Engineering,ICDE 2005.Japan,Apr. 2005.
IBM.Security in Sytem S. http://domino.research.ibm.com/comm/research_projects.nsf/pages/system_s_security.index.html,2006.
Navendu Jain,L.Amini,etc.Design,Implementation, and Evaluatiuon of the Linear Road Benchmark on the Dtream Processing Core.25th ACM SIGMOD Intl.Conf. Management of Data,Jun. 2006.
Chuanfg Liu,L.Yang,I.Foster,etc.Design and Evaluation of a Resource Selection Framework for Grid Applications.11th IEEE Sym. on High Perf. Distributed Computing,Jul. 2006.
H.Ludwig,A.Dan,B.Kearney.Cremona:An Architecture and Library for Creation and Monitoring of WS-Agreements.ACM International Conf. on Service Oriented Computing (ICSOC'04),2004.
WC3 Recommendation.Web Ontology Language (owl), Feb. 2004.
Anton Riabov,Zhen Liu. Planning for Stream Processing Systems. Proceedings of AAAI-2005,Jul. 2005.
Anton Riabov,Zhen Liu. Scalable Planning for Distributed Stream Processing Systems. Proceedings od ICAPS 2006, Jun. 2006.
T. Risch,M.Koparanova,B.Thide.High-Performance GRID Database Manager for Scientific Data. Proceedings 4th Workshop Distributed Data&Structures,Carleton Scientific Pub.,2002.
Ravi Sandhu.Lattice-Based Access Control Models.IEEE Computer,Nov. 1993.
Michael Stonebraker,U.Cetintemel,S.Zdonik. The 8 Requirements of Real-Time Sream Processing.SIGMOD Record,34 (4):42-47,2005.
The Stream Group.DTREAM:The Stanford Stream data Manager. IEEE Data Engineering Bulletin,26(1),2003.
G.Werner-Allen,K.Lorincz,M.Welsh,O.Marcillo,etc. Deploying a Wireless Sensor Network on an Active Volcano.IEEE Internet Computing,10(2):18-25,2006.
U.S. Appl. No. 11/852,389, filed Oct. 10, 2007, Zachary Adam Garbow, et al.
J. Zhou, L. Ma,Q. Liu,Zhang,Y. Yu. Minerva:A Scalable Owl Ontology Storage and Inference System. The First Asian Semantic Web Symposium, 2004.
A.Andrieux,K.Czajkowski,A.Dan,K.Keahey,H.Ludwig,T.Nakata,J. Pruyne,J.Rofrano,S. Tuecke, M.Xu.WS-Agreement,Version 2006/07.GWD-R WGGRAAP-WG,Jul. 2006.
W. Cirne, F. Brasileiro,J. Sauve,N. Andrade, D.Paranhos,E. Santos-Neto,R. Mcdeiros,F.Silva. Grid computing for Bag-of-Tasks applications. Proceedings of the IFIP I3E2003,2003.
F.Douglis,M.Branson,K. Hildrum,B.Rong,F.Ye. Multi-site cooperative data stream analysis. Operating System Review, 40(3):31-37. 2006.
C.L.Dumitrescu,I. Foster. GRUBER: A Grid Resource Usage SLA BrokER. Lecture Notes in Computer Science, 3648:465-74, 2005.
E. Elmroth and P.Gardfjall. Design and Evaluation of a Decentralized System for Grid-wide Fairshare Scheduling.1 st Int'l Conf. on e-Science and Grid Computing,pp. 221-229,2005.
K.H.Kim,R.Buyya.Policy based Resource Allocation in Heirarchical Virtual Org. for Global Grids.Proceedings 18th Int'l SBAC-PAD'06—vol. 00,pp. 36-46,2006.
.N. H. Vaidya,Impact of Checkpoint Latency on Overhead Ratio of a Checkpointing Scheme,IEEE Trans. Comput., 46(8):942-947,1997,ISSN 0018-9340.
Steve Lohr. Unused PC power to run grid for unraveling disease. The New York Times, Nov. 2004.
R. Zheng and H. Jin. An Integrated Management and Scheduling Scheme for Computational Grid. In the 2nd Int'l workshop on grid and cooperative computing. Springer, Dec. 2003.
J.U. In,P.Avery,R.Cavanaugh.Policy based scheduling for simple quality of service in grid computing.Parallel & Distributed Processing Symposium,2004.Proceedings.18th Int'l,04.
A.Borg,J.Baumbach,S.Glazer,A Message Ssytem Supporting Fault Tolerance,SOSP'83,Proc. 9th ACM Symps. Operating Systems Principles,p. 90-99.ACM Press,NY,NY,USA1983,ISBN89791-115.
F.Gelenbe,On the Optimum Checkpoint Interval.,J. ACM,26(2):259-270, 1979,ISSN 0004-5411.

(56) References Cited

OTHER PUBLICATIONS

J Hwang,Y. Xing,U. Cetintemel,S.Zdonik,A Cooperative,Self-Configuring High-Availability Solution for Stream Processing,Dept. of Computer Science, Brown University.

GLPK online resource, http://www.gnu.org/software/glpk/,Nov. 23, 2006.

J.Blythe,E.Deelman,Y.Gil,K.Kesselman,A.Agarwal,G.Mehta,K. Vahl,The Role of Planning in Grid Computing,Proc. of ICAPS-03,2003.

J.Blythe,E.Deelman,Y.Gil,C.Kesselman,H. Tangmurarunkit,Artificial Intelligence and Grids:Workflow Planning and Beyond, IEEE Intelligents Systems, 2004.

A. Brown, A. Keller,J.Hellerstein, A Model of Configuration Complexity and its Application to a Change Management System,Proc. of IM-05,2005.

E. Sirin,B. Parsia, Planning for Semantic Web Services, Semantic Web Services Workshop at 3rd ISWC,May 2004.

J.Heflin,H. Munoz-Avila,LCW Based Agent Planning for the Semantic Web, Ontologies and The Semantic Web,AAAi Workshop, 2002.

F.L'ecu'e,A. L'eger, A Formal Model for Semantic Web Service Composition, ISWC, 2006.

S. Narayanan,S.McIlraith,Simulation, Verification and Automated Composition of Web Services, WWW,2002.

M. Sheshagiri, M DesJardin, T. Finin, A Planner for Composing Services Described in DAML-S in Web Services and Agent Based Engineering-AAMAS, 2003.

P. Traverso, M. Pistore, Automated Composition of Semantic Web Services into Executable Processes, ISWC, 2004.

U.S. Appl. No. 11/733,732, filed Apr. 10, 2007, Frederick Douglis, et al.

U.S. Appl. No. 11/747,826, filed May 11, 2007, Zhen Liu, et al.

U.S. Appl. No. 11/747,820, filed May 11, 2007, Michael J. Branson, et al.

U.S. Appl. No. 11/747,813, filed May 11, 2007, Michael J. Branson, et al.

U.S. Appl. No. 11/733,724, filed Apr. 10, 2007, Michael J. Branson, et al.

U.S. Appl. No. 11/733,684, filed Apr. 10, 2007, Michael J. Branson, et al.

Oscar H. Ibarra,Chul E. Kim, Fast Approximation Algoritms for the Knapsack and Sum of Subset Problems, University of Minnesota, Minneapolis, Minnesota,Jun. 1974.

Ivan D. Baev,Rajmohan Rajaraman, Approximation Alogorithms for Data Placement in Arbitrary Networks,Northereastern University, Boston, MA.

M.R.Garey,D.S. Johnson,Computers and Intractability:A Guide to the Theory of NP-Completeness,W.H.Freeman & Co.,NY,NY,USA,1990,ISBN 0716710455.

L.Fleischer,M.X.Goemans,etc.,Tight Approximation Algoritms for Maximum General Assignment Problems,SODA17thACM-SIAM Symposiumon Discrete Algorithmsp611-620,Miami,FL,2006.

R.D. Schlichting,F.B. Schneider,Fail Stop Processors:An Approach to Designing Fault Tolerant Computing Systems,ACM Trans Comput, Sys.1(3):222-238,1983,ISSN0734-2071.

C.Swamy,Algorithms for the Data Placement Problem, Unpublished,2004.

N.H.Vaidya, Impact of Checkpoint Latency on Overhead Ratio of a Checkpointing Scheme,IEEE Trans. Comput., 46(8):942-947,1997. ISSN 0018-9340.

Drougas et al., "Load Balancing Techniques for Distributed Stream Processing Application in Overlay Environments", Proceedings of the Ninth IEEE International Symposium on Object and Component-Oriented Real-Time Distributed Computing, 2006.

Gavin Bong, "Apache SOAP Type Mapping, Part 1: Exploring Apache's Serialization APIs", 2002, IBM.

\* cited by examiner

METHOD FOR INTER-SITE DATA STREAM TRANSFER IN COOPERATIVE DATA STREAM PROCESSING

CROSS-REFERENCE TO RELATED APPLICATIONS

The present application is a continuation-in-part of co-pending and co-owned U.S. patent application Ser. No. 11/733,684 filed Apr. 10, 2007, a continuation-in-part of co-pending and co-owned U.S. patent application Ser. No. 11/733,732 filed Apr. 10, 2007, and a continuation-in-part of co-pending and co-owned U.S. patent application Ser. No. 11/733,724 filed Apr. 10, 2007. The entire disclosures of all three patent applications are incorporated herein by reference.

STATEMENT REGARDING FEDERALLY SPONSORED RESEARCH

The invention disclosed herein was made with U.S. Government support under Contract No. H98230-05-3-0001 awarded by the U.S. Department of Defense. The Government has certain rights in this invention.

FIELD OF THE INVENTION

The present invention relates to data analysis in continuous data streams.

BACKGROUND OF THE INVENTION

Systems for processing streams of data utilize continuous streams of data as inputs, process these data in accordance with prescribed processes and produce ongoing results. Commonly used data processing stream structures perform traditional database operations on the input streams. Examples of these commonly used applications are described in Daniel J. Abadi et al., *The Design of the Borealis Stream Processing Engine*, CIDR 2005—Second Biennial Conference on Innovative Data Systems Research (2005), Sirish Chandrasekaran et al., *Continuous Dataflow Processing for an Uncertain World*, Conference on Innovative Data Systems Research (2003) and The STREAM Group, *STREAM: The Stanford Stream Data Manager*, IEEE Data Engineering Bulletin, 26(1), (2003). In general, systems utilize traditional database structures, recognizing that other structures are too difficult as illustrated, for example, in Michael Stonebraker, Ugur Çetintemel, and Stanley B. Zdonik, *The 8 Requirements of Real-Time Stream Processing*, SIGMOD Record, 34(4):42-47, (2005).

These systems typically operate independently and work only with the processing resources contained within a single system to analyze streams of data that are either produced by or directly accessible by the single site. Although multiple sites can be used, these sites operate independently and do not share resources or data.

SUMMARY OF THE INVENTION

Systems and methods in accordance with the present invention provide for negotiated cooperation among a plurality of independent sites to share data and processing resources in order to process user-defined inquiries over continuous dynamic streams of data. In accordance with one exemplary embodiment, the present invention is directed to a method for cooperative data stream processing that includes identifying two or more distributed sites. Each site contains the components, either within a single node or location or distributed across the site, capable of independently processing continuous dynamic streams of data. Therefore, each site can process data independent of other sites with the system. The system can optionally contain sites that are of more limited processing capacity. The sites can be heterogeneous, homogeneous or some combination of heterogeneous and homogeneous sites.

The method facilitates the sharing among the sites of data, from primal and derived data sources including continuous dynamic data streams, processing resources and combinations thereof. Suitable processing resources include, but are not limited to, central processing unit resources, memory resource, storage resources, software resources, hardware resources, execution resources and combinations thereof. In one embodiment, facilitating the sharing includes negotiating peering relationships among the sites. Each peering relationship contains a description of the data and the processing resources shared by one or more sites and a level of autonomy maintained by these sites. Suitable peering relationships include cooperative peering relationships and federated peering relationships. In one embodiment, facilitating the sharing among sites includes using common interest polices to define relationships between sites. Each common interest policy identifies data to be shared between the sites and processing that each site is willing to perform on the data, for example in behalf of the other sites.

In one embodiment, facilitating the sharing among sites includes using a resource awareness manager in communication with each one of a plurality of data stores to obtain process resources and data from a first site and to communicate these process resources and data to one or more second sites. These data stores include relational and semantic databases.

Having identified the sites and facilitated the sharing of data and processing resources among the sites, at least one of the distributed sites having access to the shared data or processing resources is used to process user-defined inquiries over continuous dynamic streams of data. In order to use the sites to process user-defined inquiries, data from a plurality of remote sites can be communicated to a single home site, data can be processed at each one of a plurality of home sites before communicating the processed data to a single home site, effective ownership of data disposed at one or more remote sites can be transferred to a single home site and remotes sites can be used to schedule processing of data.

In one embodiment, using the distributed sites to process user-defined inquiries includes identifying a distributed plan for each user-defined inquiry. Each distributed plan is translated into a job such that each job utilizes data and resources from one or more of the sites and executes one or more subjobs on each of the identified sites. In one embodiment, each job includes a plurality of interconnected processing elements and identification of one or more jobs includes identifying the processing elements associated with each job. In addition, execution of each job includes building one or more subjobs or applications containing identified processing elements from one or more jobs and executing each subjob on one of the identified sites. The method also includes managing the execution of the processing elements on the distributed sites. In one embodiment, processing demands are transferred from a first site to a second site in order to facilitate processing of the subjobs.

The present invention is also directed to a cooperative data stream processing system containing two or more distributed sites. Each distributed site is in communication with other sites and contains an independent instance of a data stream processing environment. The system also includes a plurality of peering relationships among the sites to facilitate cooperation among the sites for sharing data and processing resources. In one embodiment, each independent instance of the data stream processing environment includes a stream processing core to manage the distributed execution of subjobs on the site, a scheduler to control flow of data and resources between sites, a storage management system to control data to be persisted and a planner to assemble the subjobs to be executed on the site based on user-defined inquiries.

In one embodiment, each independent instance of the data stream processing environment contains a complete instance of a system architecture that facilitates receipt of user-defined inquiries, processing these user-defined inquiries on continuous data streams using the sites and communicating results of the processing. Suitable system architectures include a user experience layer to interface with users to accept the user-defined job inquiries and to delivery the processing results, an inquiry services layer in communication with the user experience layer to facilitate descriptions of the user-defined inquiries, a job planner disposed within the inquiry services layer, the job planner capable of identifying one or more distributed plans associated with each inquiry and capable of translating each distributed plan into a distributed job, a job management component in communication with the job planner capable of executing the jobs using the sites and a stream processing core to manage the execution of the jobs on the sites and to deliver the processing results to the user experience layer. In one embodiment, the architecture also includes a data source management component in communication with the job planner. The data source management component is capable of matching data streams to jobs.

Systems and methods in accordance with the present invention also include mechanisms for data stream transfer between data stream processing sites. In order to accomplish inter-site data stream transfer, streams of data that flow normally within a stream processing site and are instead transported from an originating site to a destination site in such a way that they flow appropriately into the stream processing at the destination site. Data stream transfer between sites will also compensate for the heterogeneous nature of the distributed, independent sites in the system. A variety of attributes including security policies may differ between cooperating sites, requiring the mapping and translations of the data streams being transferred. In addition, there are challenges associated with network performance and failure recovery that need to be addressed in by the stream transfer mechanism.

In accordance with one embodiment for inter-site communication of data streams in a cooperative data stream processing system, a plurality of distributed sites are identified that will be used to host a distributed job. The distributed job was either automatically derived to satisfy an inquiry or hand-crafted by a developer. Each identified site contains one or more nodes and is capable of independently hosting subjobs in support of the distributed job. Data streams must flow between the processing resources at the distributed sites to execute the distributed job. This data flow between sites is facilitated by establishing one or more tunnels between a given pair of distributed sites selected from the identified plurality of distributed sites. Data streams flow between the pair of distributed sites as required to accomplish the execution of the distributed job. The tunnel is used to transport data streams between the given pair of sites.

In one embodiment, each tunnel is established by establishing network connections between the pair of distributed sites. A tunnel sink processing element is deployed on an originating site in the pair of sites in communication with the network connections. The tunnel sink processing element is capable of sending data streams from the originating site across the network connections to a destination site in the pair of sites. A tunnel source processing element is deployed on the destination site in communication with the network connection. The tunnel source processing element is capable of receiving data streams send across the network connections by the tunnel sink processing element. Suitable methods for establishing network connections include connection handshaking as defined in protocols such as TCP/IP.

In one embodiment, a new tunnel between the pair of sites is established each time a new distributed job requires stream data flow between the pair of sites. Therefore, a plurality a tunnels can be used between any pair of sites within the system. Alternatively, a single tunnel is established between the pair of sites and is used to exchange all data streams associated with any distributed jobs running on the pair of sites. Tunnels can be established on demand as a distributed job executes involving the pair of sites. Alternatively, a distributed plan containing a definition of the required tunnel flows can be used to pre-establish tunnels before a distributed job executes. The definition of a required tunnel flow includes an identification of an originating site in the pair of sites and a destination site in the pair of sites, an identification of the originating site processing element to be involved in data stream transfer and an identification of the destination site application processing element to be involved in data stream transfer, an identification of the types of data streams to be exchanged through the tunnel, security and privacy labels of data streams to be exchanged, type mappings and a priority associated with each type of data stream to be exchanged. In one embodiment, a plurality of tunnels is established, and the distributed plan includes definitions for a plurality of required tunnel flows. In order to establish a tunnel between a given pair of distributed sites, the identified originating site and the identified destination site are notified regarding the distributed plan, and the definition of the tunnel flow is communicated to the originating site and the destination site.

In one embodiment in order to establish a tunnel between a given pair of distributed sites, data flow relationships are established between application processing elements running on the originating site and the tunnel sink processing element and application elements running on the destination site and the tunnel source processing element in accordance with the tunnel flow definitions to facilitate exchange of the data streams.

In one embodiment, in order to use the tunnel to exchange data streams between the given pair of sites, the data streams are changed from a stream format to a network presentation. In addition, the data streams can be transformed to compensate for heterogeneity between the pair of sites and to adjust for security differences between the pair of sites. The tunneling mechanism provides for the establishment, modification and termination of tunnel flows between pairs of sites to exchange data between the pair of sites.

In addition to providing for a tunnel between a single pair of sites in the system, a plurality of tunnels can be established between distributed sites arranged as a plurality of pairs of distributed sites and selected from the identified plurality of distributed sites. Each pair of sites transfers data streams required for the processing of a distributed job involving that pair of distributed sites, and each tunnel is associated with one of the plurality of pairs of distributed sites. These tunnels are used to exchange data streams between the pairs of sites. These tunnels can be configured as job specific or generic, that is tunnels can be established to exchange specific data streams or established to exchange any type of data stream. In addition, tunnels can be created in accordance with a plan or on-demand in response to a given job. When plans are used, a plurality of distributed plans is created. Each distributed plan includes definitions of the required tunnel flows that will be accomplished using of one of the plurality of tunnels. These definitions include an identification of an originating site in the pair of sites and a destination site in the pair of sites, an identification of originating site application processing elements to be involved in data stream transfer and an identification of destination site application processing elements to be involved in data stream transfer, an identification of data streams to be exchanged through the tunnel and a priority associated with each data stream to be exchanged.

When a plurality of tunnels between pairs of distributed sites are created, for each tunnel flow, the identified originating site and the identified destination site regarding the distributed plan are notified, and the definition of the tunnel flows are communicated to the originating site and the destination site. In one embodiment, for each tunnel, data flow relationships between application processing elements running on the originating site and the tunnel sink processing element and application elements running on the destination site and the tunnel source processing element are created in accordance with the tunnel flow definitions to facilitate exchange of the data streams.

DETAILED DESCRIPTION

Figure 1:
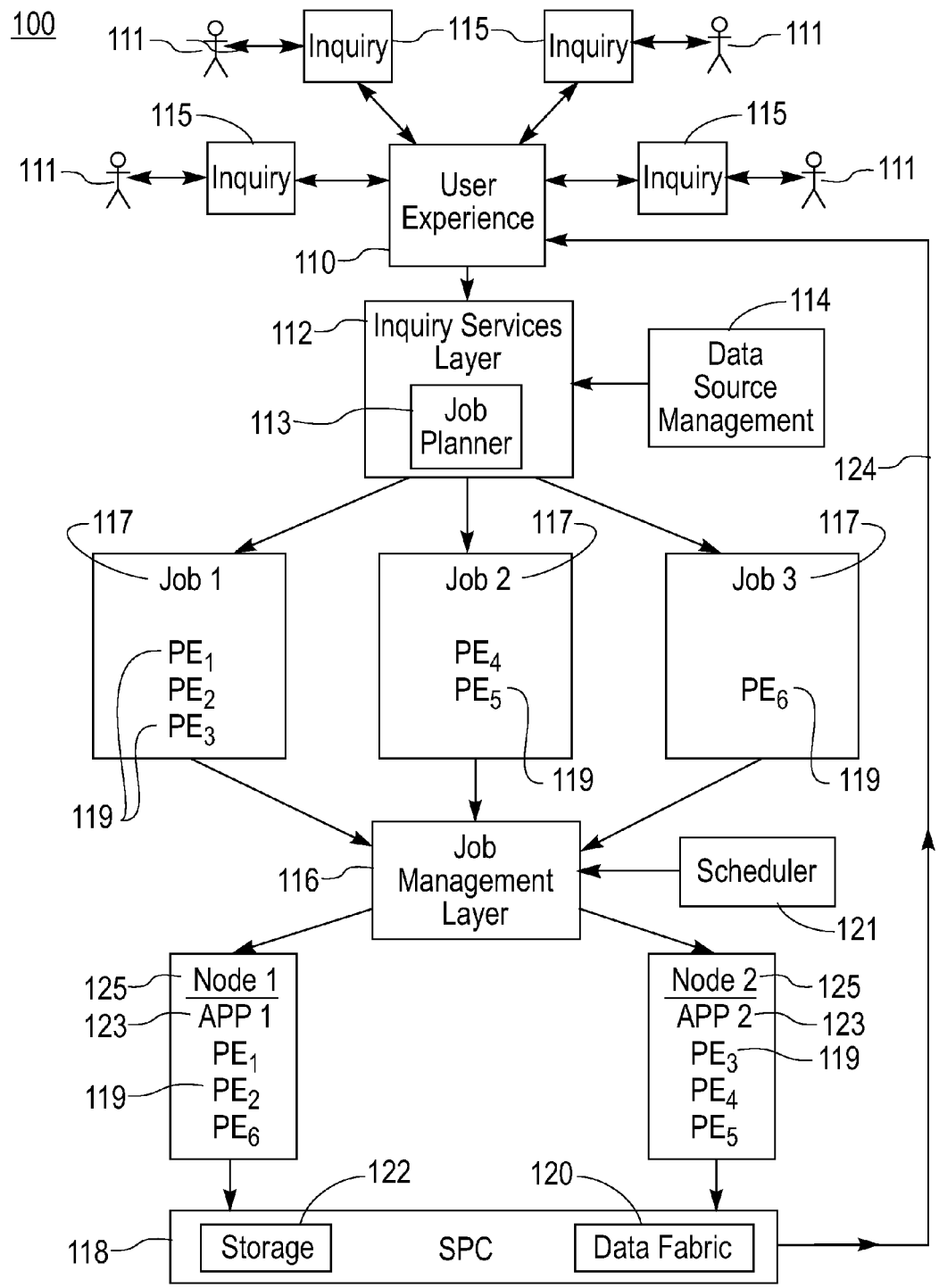
FIG. 1 is a schematic representation of an embodiment of a system architecture for use on all sites within the cooperative data processing system of the present invention.

Systems and methods in accordance with the present invention provide for the inter-cooperation of multiple, autonomous, distributed stream processing sites. Each individual stream processing site is capable of processing a continuous dynamic flow of information that is created internally at that site or that originates from sources external to that site. Important or relevant information is extracted from a continuous stream containing voluminous amounts of unstructured and mostly irrelevant data. Processing of data streams in accordance with the present invention is utilized in analyzing financial markets, for example predicting stock value based on processing streams of real-world events, supporting responses to natural disasters such as hurricanes and earthquakes, for example based on the movement of rescue vehicles, available supplies or recovery operations and in processing sensor data. Examples of sensor data that can be analyzed include data on volcanic activity as described in G. Werner-Allen et al., *Deploying a Wireless Sensor Network on an Active Volcano*, IEEE Internet Computing, 10(2):18-25 (2006) and telemetry from radio telescopes as described in T. Risch, M. Koparanova and B. Thide, *High-performance GRID Database Manager for Scientific Data*, Proceedings of $4^{th}$ Workshop on Distributed Data & Structures (WDAS-2002), Carleton Scientific (Publ), 2002.

Exemplary embodiments of cooperative data processing systems in accordance with the present invention provide for rapid system reconfiguration. The system adjusts quickly to the changing requirements and priorities of users and administrators. As the system adjusts, it simultaneously identifies and incorporates new input streams into its processing and manages the loss of existing data sources or processing capacity.

Cooperative data stream processing systems in accordance with the present invention function well under high load. In one embodiment, the system is assumed to be in a constant state of overload and must continually adjust its resource allocations to support the highest priority activities. Applications utilizing exemplary embodiments of the system for cooperative data stream processing in accordance with the present invention contain significant resilience to variations in processing resources, missing data and available input streams, among others. The missing data include data that is pushed out by more important data as described in Fred Douglis et al., *Short Object Lifetimes Require a Delete-Optimized Storage System*, Proceedings of $11^{th}$ ACM SIGOPS European Workshop (2004).

Exemplary systems for cooperative data stream processing in accordance with the present invention are typically heterogeneous. A given system for cooperative data stream processing contains a plurality of distributed sites. In one embodiment, each site is autonomous. Certain sites include substantial processing capacity, for example, thousands of processing nodes and terabytes to petabytes of storage. Other sites within the system have limited resources. Sites with limited resources may provide specialized or specific tasks such as data acquisition. Although two or more sites can be operated by a single domain or organization, each one of the plurality of sites is preferably completely autonomous and can vary significantly in execution environment, policies and goals. The extent and type of cooperation provided by each autonomous site varies based on the structure and compatibility of any given set of sites.

Cooperative data stream processing systems in accordance with the present invention include a stream processing core to manage the distributed execution of software components of applications, a nano-scheduler to control the traffic flow between components, a storage management system to control the data to be persisted in the storage system based on retention values, a planner to assemble applications or jobs based on user requests and available software components and a security enforcement architecture. In general, the plurality of sites that are contained with the cooperative data stream processing systems cooperate. The resultant interactions are supported and balanced against other requirements and challenges including autonomy, privacy and security constraints and differences in execution environments among the various sites.

Exemplary systems in accordance with the present invention utilize cooperation among the various sites. This cooperation takes several forms. Sites cooperate by exchanging data. Each site can pass primal data streams on to other sites that need to analyze the same input data. Primal data streams are data streams that are brought into one site from outside the system. In addition, each site can pass derived data streams on to other sites. Derived data streams are data streams that are created within a site using analysis of other streams, for example primal data streams. Sites also cooperate by sharing resources such as execution resources, software resources and hardware resource, among others, in order to handle processing overloads. Overloads result from sudden increases in the system workload or sudden decreases in available resources, for example due to partial failure of a given site. In the case of a complete failure of a given site, cooperation provides for the shifting of important processing to another site. Cooperation also provides for access to specialized resources, for example devices and services, that are unique to certain sites.

Referring initially to FIG. 1, an exemplary embodiment of an architecture 100 for the cooperative data stream processing systems of the present invention is illustrated. The architecture includes a plurality of layers. This first or highest layer is the user experience (UE) layer 110. The UE layer provides the interface between the cooperative data stream processing system and users 111 of the system. Each user interacts with the system through an interface such as a graphical user interface (GUI) on a computing system in communication with one or more of the plurality of sites within the system. Through this interface, each user presents inquiries 115 to the system that the system processes through one or more primal or derived data streams using the cooperating sites within the system. In one embodiment, these inquiries are converted to high-level queries. An example of a high-level query is to provide a listing containing the locations of all bottled water reserves within a hurricane relief area. The UE layer 110 is also used by the cooperative data stream processing system to deliver the query results through the UE to the requesting user.

In communication with the UE layer is the inquiry services (INQ) layer 112. The INQ layer facilitates the description of a user's job request and the desired final results in a predetermined high level language. These high level languages are used to depict the semantic meaning of the final results and to specify user preferences such as which data sources to include in or to exclude from the plan. The INQ layer includes a job planner 113 subcomponent that determines or identifies, based on the user-defined inquiries as expressed in the appropriate high level language, appropriate primal or derived data sources and processing elements (PEs) that can achieve the desired goals of the inquiry. A job contains a composition of data sources and processing elements interconnected in a flow graph. The job planner subcomponent submits the produced jobs to the job management component 116 for execution. The job planner subcomponent, in defining the jobs, takes into account various constraints, for example, available input data sources, the priority of the user-defined inquiry, processing available to this inquiry relative to everything else being produced by the system and privacy and security constraints, among other factors. Examples of suitable planner components are described in Anton Riabov and Zhen Liu, *Planning for Stream Processing Systems*, Proceedings of AAAI-2005, July 2005 and Anton Riabov and Zhen Liu, *Scalable Planning for Distributed Stream Processing Systems*, Proceedings of ICAPS 2006, June 2006.

In one embodiment, the cooperative data stream processing system includes a data source management (DSM) component 114 in communication with the INQ layer and the job planner. Since there are many possible data streams that a job can process, including both primal streams from outside the system and derived streams created by sites within the system, the DSM component matches jobs, i.e. from user-defined inquiries, with appropriate data streams. In order to match jobs with data streams, the DSM component utilizes constraints specified in the user-defined inquiries. These constraints include, but are not limited to, data type constraints and source quality constraints. The DSM component returns data source records that provide information to access these data sources. In one embodiment, the INQ layer and job planner use the DSM component to formulate job execution plans, which are then submitted to lower levels of the system.

In response to user-defined inquiries and in combination with the data source records provided from the DSM component, the job planner formulates at least one distributed plan that can be translated into one or more distributed jobs 117 to be executed within the system and delivers these jobs to the job management layer 116 of the system. Each job resulting from the job planner subcomponent contains a plurality of interconnected PEs 119. In one embodiment, incoming data stream objects are processed by the system to produce outgoing data stream objects that are routed to the appropriate PE or to storage. The PEs can be either stateless transformers or much more complicated stateful applications. The cooperative data stream processing system through the job management layer identifies the PEs in the submitted jobs and builds one or more subjobs or applications 123 from the PEs of different jobs by linking these PEs, possibly reusing them among different subjobs, to enable sophisticated data stream mining. Therefore, even though the PEs are initially associated with a given job, the PEs are re-associated into one or more subjobs in order to facilitate the desired data stream mining. Thus, the PEs of a given job can be associated with the same subjob or with different subjobs and can run on either the same or different processing nodes 125 within the system. In one embodiment, the job management layer 118 within each site is responsible for initiating and terminating jobs through the creation and initiation of the subjobs containing the PEs of the jobs. In one embodiment, each job management layer is in communication with an optimizing scheduler 121 that allocates nodes to PEs based on criteria including priority, inter-node connectivity and bandwidth requirements. As illustrated, the job management layer is responsible for the creation and initiation of subjobs on the various nodes. Alternatively, the job planner in the INQ layer includes the functionality to define subjobs and associate these subjobs with the appropriate nodes.

The system also includes a stream processing core (SPC) 118 that manages the distributed execution of the PEs contained within the subjobs. The SPC includes a data fabric 120 component and a storage 122 component. The data fabric component facilitates the transport of data streams between PEs and persistent storage, i.e., storage 122. Therefore, data can optionally be routed to storage as needed. A nano-scheduler provides adaptive connectivity and fine-grained scheduling of communicating subjobs. In one embodiment, the nano-scheduler is located within the scheduler 121. The scheduler 121 is a three-tier scheduler. The first tier is a macro scheduler running at longer time scales and deciding things such as which jobs to run. The second tier is a micro scheduler running at short time scales and dealing with changes in system state. The third tier is a nano scheduler running at the finest time scale and dealing with flow variations. The storage component uses value-based retention to automatically reclaim storage by deleting the least valuable data at any given time. Results flow back 124 from PEs to the UE layer for delivery to the requesting user.

Each one of the plurality of sites within the cooperative data stream processing system runs an instance of the system architecture illustrated in FIG. 1. Therefore, as used herein, each site is a self-contained, fully functional instance of the cooperative data stream processing system of the present invention. In one embodiment, each site runs an instance of each component of the system architecture as described above in addition to a fault-tolerant service. In one embodiment, each site belongs to a distinct organization and has its own administrative domain, i.e., administrators who manage one site generally exercise no control over the other sites within the system. In this respect, the process of distributing cooperative data stream processing systems of the present invention among multiple sites is similar to Grid Computing. Cooperation among the plurality of sites is achieved by the sites negotiating peering relationships, for example offering resources to each other while retaining a desired level of local autonomy. In one embodiment, two or more sites within the cooperative data stream processing system that want to collaborate for a common goal and benefit negotiate and form one or more virtual organizations (VOs). The sites can be homogeneous, heterogeneous or combinations of heterogeneous or homogeneous sites.

Exemplary embodiments of cooperative data stream processing systems in accordance with the present invention are powerful processing systems capable of solving complex analysis problems. Cooperation among the plurality of distinct, distributed sites enhances the capabilities of the cooperative data stream processing system. With regard to the breadth of analysis provided by the cooperative data stream processing system, a single organization addresses a set of problems that require data analysis by processing only the relevant data that the single organization alone is able to access. However, when two organizations work in conjunction, a larger and more diverse set of data is available for analysis. This increase in the size of available data expands the range of problems that can be analyzed, improves the quality of the resulting output of the analysis and facilitates the addition of analysis types not available in a single organization. For example, a multinational financial services company might perform detailed acquisition and analysis of companies, economies and political situations within the local geographic region of each of its analysis sites. These various sites could interoperate minimally by default, but cooperate closely upon a significant event or when analysis of multinational organizations is required.

Cooperation enhances both reliability and scalability within the system. With regard to reliability, the reliability of one site is significantly improved through the use of agreements with other sites to take over key processing and storage tasks when failures occur. With regard to scalability, cooperation among sites provides increased scalability as extreme scalability cannot be achieved through unbounded growth of an individual site. The cooperation of multiple autonomous sites achieves much higher levels of scalability. In addition, cooperation across sites allows offloading of processing demands to other sites when one site experiences a workload surge.

Cooperative data stream processing systems in accordance with the present invention support a range of distribution or peering models, ranging from basic models to sophisticated models. In one embodiment, the system is arranged to support a range of different peering models between sites. Negotiated common interest policies (CIPs) define the relationships among sites, and thereby the formation of virtual organizations (VOs). Although each VO can be a distinct entity containing an exclusive grouping of sites, different VOs may overlap with one another, i.e. may contain the same sites. Therefore, any one of the plurality of sites can participate in multiple VOs. This structure facilitates basic point-to-point, i.e., site-to-site, peering and peering between entire VOs having sites arranged in hierarchical, centralized or decentralized arrangements. For simplicity, the distribution models discussed below are described in the context of basic point-to-point interaction between sites.

In one embodiment of a basic distribution model, all processing takes place at a home site, i.e., the site performing an inquiry and making use of resources from other sites. Data source sharing is achieved by directly shipping data from remote sites across the network for processing at the home site. Shared data sources include real-time data streams and stored data. Implementing this distribution model creates the necessity for distributed data acquisition capabilities to identify and to access remote data sources and a stream processing engine that can send and receive streams remotely. One advantage of the basic distribution model is simplicity. Data from another site is used with local processing, and the amount of processing and network bandwidth resources consumed are related to the volume of the data streams originating at remote sites. Larger volumes of transferred data, however, consume more resources. Primal streams in particular consume large amounts of resources in this distribution model as these streams undergo little to no processing at the remote site to reduce their size. Derived streams may be at a more manageable data rate, presenting less of an issue, but in some cases even a derived stream is voluminous.

In another embodiment of the distributed processing model, preliminary processing of a data source is conducted at the site from which the data source originates. This arrangement addresses the issue of sending large amounts of data across the network. In addition, duplicate processing is reduced when two or more sites want to access the same data source from a third site and need to perform the same or similar processing. This approach adds complexity, however. If a data source is not already being accessed on the remote site, then processing must be initiated there on behalf of the home site, raising issues of trust between the cooperating sites, as one site is asking the other site to execute potentially arbitrary code on its behalf. The trust issue is addressed using the CIP that exists between the sites. One aspect of a CIP reflects the arrangement each site has negotiated by specifying the data sources each site is willing to share and the types of processing each site is willing to perform on the shared data sources.

Other distribution models achieve more distributed processing. In one embodiment, effective ownership of some resources in the remote site is transferred to the home site. Therefore, the scheduler located at the home site allocates those resources or processing nodes for which ownership has been transferred to the home site. This model is referred to as resource partitioning and requires a relatively high level of cooperation and trust between the remote site and the home site. In another embodiment, processing is scheduled by the remote site and includes commitments regarding the allocated resources. In this embodiment, which is effectively a service-level agreement (SLA) model, a greater degree of site autonomy is maintained. In addition, this model facilitates sharing when multiple sites want to access the same data stream.

In another embodiment of the distributed planning model the availability of both data sources and processing resources at multiple sites are considered as part of the planning process. For example, if the home site requires several data sources from a remote site, the most logical solution may be to send an entire job or subjob over to that remote site as opposed to communicating the data sources from the remote site to the home site. Similarly, a given set of PEs may be broken down and distributed among a plurality of sites according to the availability of data sources and the processing capability at each site. In order to partition a processing graph intelligently, the availability of data sources, PEs and processing resources at each site must be known. Therefore, the identification of other job components running at a specific site and how important these jobs are in comparison to the one being planned are taken into consideration. In addition, the execution of the distributed plan is monitored closely to ensure that each site involved is operating effectively and that the overall plan is executing as efficiently as possible across the sites. Execution issues discovered via monitoring feedback can trigger re-planning of the entire job or a portion of the job.

Preferably, a combined model approach to distributed planning is used. This combined model approach is more complex than the models described above; however, the combined model is the most powerful model. The combined model approach receives support from several components in the cooperative data stream processing system architecture including the INQ layer and the scheduler. A higher degree of interoperability and trust between sites is utilized by the combined model approach. This higher degree of trust can be based, for example, on the CIPs for the plurality of sites within the cooperative data stream processing system. In general, however, distributed planning is a central feature to system-wide or region-wide effectiveness and efficiency. Multiple sites that cooperate for the good of the entire system as a whole, rather than optimizing independently and in isolation, optimize the use of resources by optimizing the subdivision and placement of jobs according to their inputs, execution patterns and priorities, among other factors.

In one embodiment, an increased level of integration is provided by situating a given instance of the job management layer and scheduler to encompass multiple sites. Therefore, this instance of the job management layer and the scheduler optimize multiple sites concurrently, treating these sites as a whole. This increased level of integration requires the greatest level amount of interoperability and trust between sites. Depending on the degree of integration, sites can be either cooperative, in which the sites work toward certain common goals but retain a significant amount of autonomy, or federated, in which sites subordinate to a single lead site. In one embodiment, the integration arrangement among the sites is expressed in the CIPs.

As was discussed above, when two or more sites located within the cooperative data stream processing system of the present invention agree to interoperate to achieve common or distinct goals that this sites were are unable to achieve in isolation, the sites form a VO. An example of forming VOs is described in Ian Foster, Carl Kesselman and Steven Tuecke, *The Anatomy of the Grid: Enabling Scalable Virtual Organizations*, Lecture Notes in Computer Science, 2150 (2001). In forming a VO, the member sites agree, i.e. negotiate, on inter-operational terms. These negotiated terms are formulated into a CIP for that VO. As member sites of a given VO, each site shares various types of data and processing resources in accordance with the CIP.

In defining the interactions among the member sites, each site agrees to a predetermined style of interoperation for the VO, i.e. cooperative or federated. A federated VO includes an appointed lead site for the VO. The lead site assumes a coordination role and is able to exert a level of control over the other sites. Federated VOs function best when the member sites share a common set of goals. The lead site is able to optimize resource and processing usage to support the common good of the VO or at least the good of the lead site. A cooperative VO lacks a central point of authority. The VO members interact as peers. Each member site is independent of the other sites and may have a separate agenda. However, the member sites recognize that operating in a cooperative manner increases the overall fulfillment in each independent goal.

In general for all VOs, the CIP includes the terms and conditions governing the interoperability among the plurality of member sites of the VO. In one embodiment, the CIP identifies the data streams and locally stored data that are shareable via remote access. This identification includes identifying classes of data streams and other data based on their attributes, since it may not be possible at the time the CIP is created to predict the data streams and other data that will exist in the future. A given CIP references the classes within the terms for that CIP. For example, a given data stream is tagged globally public, locally public or private, and a CIP term is created that grants read accesses for all globally public streams. As another example, a data stream is tagged as coming from a publicly accessible sensor, e.g., a traffic camera, and the CIP contains a term that states that public sensors are freely shared. In one embodiment, a CIP term is general and specifies that any data source located in a particular location, e.g., city, is shared, without such explicit tagging.

The CIP also includes terms to identify processing resources that are sharable. These terms identify member sites that support remote inquiries and, therefore, support the distributed planning interaction model. In addition, these terms identify member sites that only support the distributed processing and distributed data source interaction model. In one embodiment, the CIP terms identify the types of raw processing resources that are available to be shared. Suitable processing resources include, but are not limited to, central processing unit (CPU), memory, storage, software and hardware including special processing hardware. The types of available raw processing resources identify the VO as supporting the resource partitioning model, the SLA-based model or both models. The CIP terms can also identify the member sites that are available to assist in failure recovery processes and the degree of assistance available from each one of these member sites.

The processing resources within the VO can be offered to all member sites of the VO. Alternatively, the processing resources are offered to only a subset of the member sites, as specified in the terms of the CIP. In one embodiment, anything that is not explicitly offered in a CIP is not allowed. By specifying these terms in the CIP, each VO member site is advertising resources that another VO member site may request to use. However, the ability of other member sites to actually use these resources is not guaranteed. Some resources are limited in nature, and, therefore, the site providing these limited sources may not be able to satisfy all requests from all consumer sites, at least not with the quality of service that the consumer sites expect. Therefore, in order for a VO member site to reserve an exclusive use of the limited resource, this member site establishes an agreement with the providing member site. This agreement is used in both the SLA and resource partitioning model described previously.

In addition to defining the set of agreements that are possible in a VO, the CIP specifies the particulars that are available for an agreement, for example the quality of service levels, costs and limitations on the resource usage. Once established, a given resource agreement is referenced every time a request is made for that resource. The terms and conditions of the agreement, in addition to the costs and penalties, are continuously monitored by auditing functions located at both sites that are members to the agreement, i.e., the sites providing and consuming the resource.

In the cooperative data stream processing system of the present invention, the CIPs provide the creation templates that are used to create agreements between the provider and the consumer of the resource to be shared. These templates are used to create an actual agreement to access particular resources over a specified time interval. In addition, the CIPs define higher-level business interaction schemes between VO member sites. For example, the stakeholders of a given site can specify in the CIP not only the types of possible interactions between the VO member sites, but also the conditions under which agreements can or cannot be established. CIP terms are made within a VO-wide context and not just in the context of two member sites. In addition to describing the interoperation terms between member sites regarding resource sharing, the CIP also contains the technical communication details that are necessary to establish the communication channels among the various member sites. In one embodiment, the member sites that are members of a given VO are heterogeneous, for example having different data formats and security labels. To overcome issues related to handling heterogeneous systems, the CIP contains information regarding the kind of environment mapping required in order for the various types of sites within the VO to communicate.

Each site within the cooperative data stream processing system is not limited to being a member of only one VO. A given site can be a member site in a plurality of different VOs, both federated and cooperative. However, although member sites of a given VO interact and cooperate, member sites of different VOs are not allowed to interact directly with each other. If a given site attempts to use resources from multiple VOs, that site must act as a common point of contact to bridge data from one VO to another VO. Alternatively, that site can interact separately with each VO, merge the results internally and present the merged results to the user, subject to the constraints in the multiple VOs' CIP terms as agreed.

In one embodiment, a given VO can join as a member of another VO, forming a hierarchical VO structure. The joining VO honors any interoperation terms that are expressed in the CIP of the VO to which it joins. The joining VO uses the resources of its member sites resources to fulfill requests in accordance with the interoperation terms. How the member sites of the joining VO are used depends upon the type of VO. For a federated VO, the VO lead site delegates requests to the joining VO member sites as the lead site determines is appropriate. A cooperative VO that joins as a member of a larger VO requires extensive negotiation to specify in the CIP how the member sites of the cooperative VO can be used.

Figure 2:
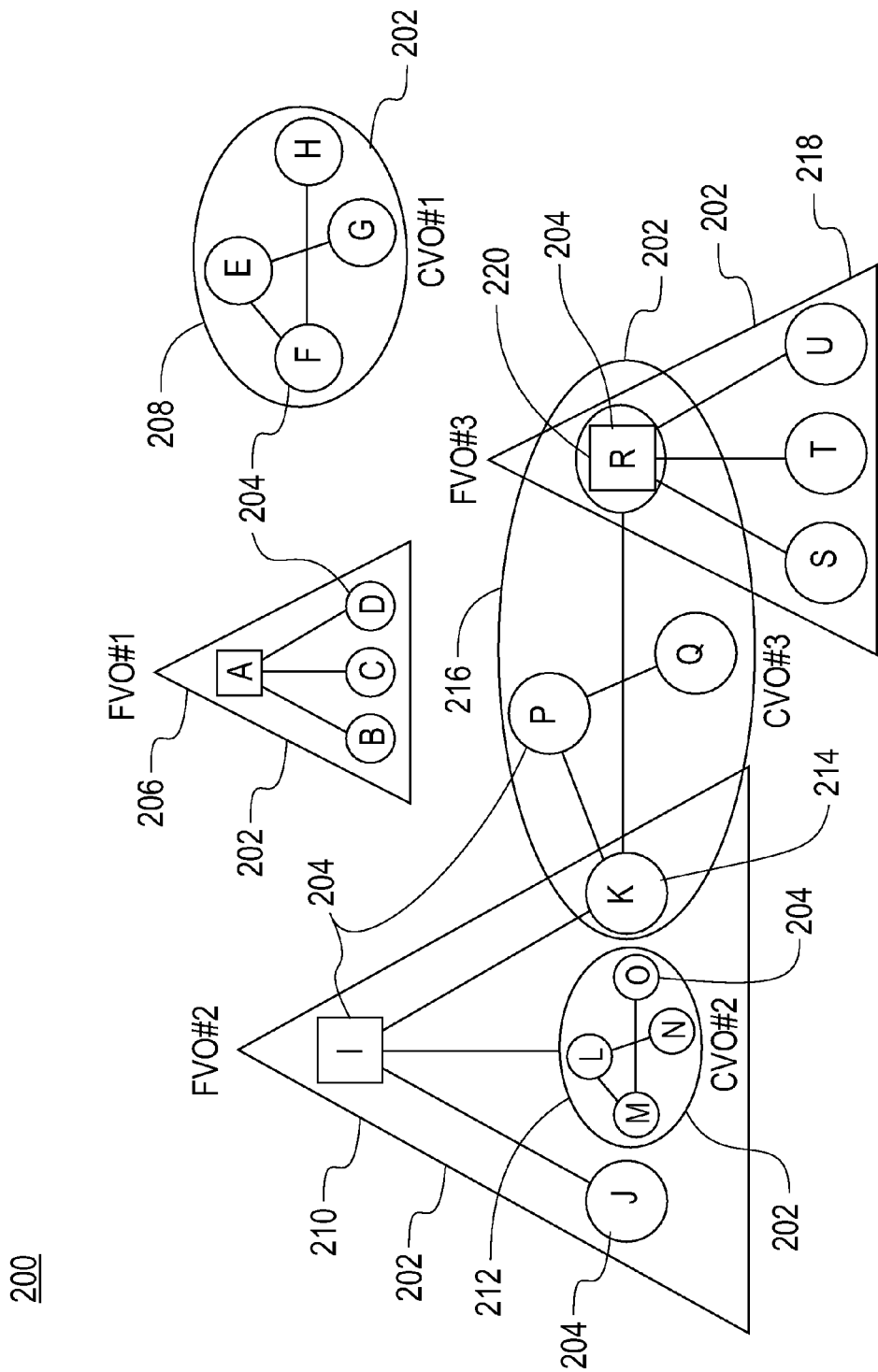
FIG. 2 is a schematic representation of an embodiment of peering relationships among sites within the cooperative system.

Referring to FIG. 2, an exemplary embodiment of a complex VO structure 200 in accordance with the present invention is illustrated. As illustrated, triangles represent federated VOs, and ovals represent cooperative VOs. Individual member sites are represented as circles, and federated lead sites are squares. The structure includes a plurality of VOs 202, and each VO contains a plurality of member sites 204. One of the plurality of VOs is an isolated federated VO 206 (FVO#1), and one of the plurality of VOs is an isolated cooperative VO 208 (CVO#1). Since the member sites in these VOs are not members of any other VOs, the only sites they are able to interact with are the other members of that same VO. For example, site A is only able to interoperate with sites B, C, and D. A second federated VO 210 (FVO#2) contains three member sites, lead site I and participant sites J and K. In addition, the second federated VO 210 includes a member that is itself a cooperative VO 212 (CVO#2). One of the member sites 214 (K) is also a member site of a cooperative VO 216 (CVO#3). This cooperative CO also includes three other member sites. Another federated VO 218 (FVO#3) is provided having four member sites, and the lead member site 230 (R) is also a member site of one of the cooperative VOs 216.

These mixed and overlapping hierarchical VO structures allow very complex structures to be created. Care is taken in constructing these structures to avoid creating operational issues. For example, the second cooperative VO 212, while organized as a cooperative VO, is joined to a federated VO 210. Therefore, the member sites of the joining cooperative VO agree to some degree to a higher level of control from the lead member site of the federated VO. Therefore, when a VO, either cooperative or federated, joins another VO, all member sites are involved in the decision as the decision affects all the member sites. In general, joining a cooperative VO causes less impact on the joining member sites, because the joining members retain a high degree of individual control. When a federated VO lead site 220 joins a cooperative VO 216, that lead site maintains a high degree of flexibility in delegating work to member sites in the federated VO, since the lead site retains control over the members of the federated VO. This ability of a lead site to delegate or off-load responsibilities enables the lead site to re-mission its resources to better fulfill any requests imposed on it due to its membership in the cooperative VO. Because the member sites (S, T, U) in the federated VO (FVO#3) are not in the cooperative VO (CVO#3) like the federated VO leader site, these sites are not able to interact directly with the other members of the cooperative VO (CVO#3) and must interact via the federated VO leader site (R).

Although sites and VOs may be members of multiple VOs simultaneously, they are not allowed to join a VO if this would cause a conflict with their existing peering relationships. For example, if a site is a member of a VO that requires it to share a given resource with a second site, that site is not allowed to join another VO that prohibits the sharing of this same resource with the same site, unless that site withdraws from the first VO. In one embodiment, a given site can choose which terms it wants to adhere to and which VO it wants to join.

As used herein, resource awareness refers to the discovery and retrieval of information about data sources, PEs and other kinds of resources, for example execution resources and active inquiries, among multiple collaborating sites. Each site stores information about such resources in relational or semantic data stores. In one embodiment, the instance of the data source management component on each site maintains low-level characteristics, e.g., delays and data rates, about data sources in a relational database and semantic descriptions in a semantic metadata store. The component that provides the discovery and retrieval of information about remote resources is the resource awareness engine. The resource awareness engine is in communication with the other components on a given site and is used by these components to retrieve desired information. For example, if a distributed job planner needs to know the kinds of data sources and PEs that are available at remote sites in order to produce global plans that utilize resources in a VO, the distributed job planner uses the resource awareness engine to access such information about other sites. The same applies to PEs and other kinds of resources as well.

The resource awareness engine provides a layer of indirection between endpoints. For example, a store or a client does not need to interact with the other end directly. The ability to eliminate the need for interaction between endpoints is particularly beneficial when there are many endpoints. The resource awareness engine provides a universal interface that endpoints use to communicate, and the resource awareness engine conceals underlying complexities and dynamics so that the endpoints always see the same interface. The addition or withdrawal of any site is handled by the resource awareness engine and becomes transparent to each client.

The resource awareness engine provides two kinds of interfaces. The first interface is a search interface, which is the "pull" mode of resource discovery. A client sends a query to the resource awareness engine, specifying the resources that are requested. The resource awareness engine searches and returns matching resources from multiple remote sites. The second interface is a publish/subscribe interface, which is the "push" mode of operation. Sites having resources to advertise and share with other sites publish the information to the resource awareness engine. Sites requiring resources subscribe to the resource awareness engine and specify the resources needed. The resource awareness engine actively pushes matching resources to the requesting sites. These two interfaces fulfill different needs within the system. The "pull" mode interface is suitable for clients, for example the failover site selection component, that request dynamically changing resources once in a while, only upon infrequent events, e.g., site failures, and only requiring the most up-to-date information. The "push" mode interface is suitable for clients, for example the Planner, that want to keep updated about continuously changing information, not just current but also past information. This interface keeps the client up to date about variations. A client may use a combination of "pull" and "push" interfaces for different types of resources as well.

Two different engine components in the resource awareness engine interact with system endpoints. These components are the exporter component of the resource awareness engine and the importer component of the resource awareness engine. The exporter component is responsible for interacting with a resource store that has data to publish or that is willing to accept external queries. The exporter component receives resources advertised by the store and relays these resources to the importer component. Alternatively, the exporter component receives queries from importer components, forwards these queries to the resource store and returns results. The importer component interacts with sites that request resources. The importer component receives queries from the sites and relays these queries to the exporter component. Alternatively, the importer component accepts subscriptions from sites and actively pushes matching resources back. In one example of data source discovery using the resource awareness engine, an existing single site component manages resource stores. When a client, for example a distributed planner, needs to discover remote data sources, the client sends a query to its local importer component. The importer component checks the CIP to identify sites that it can search. The importer component forwards the query to the exporter component of the identified sites. The exporter component checks the CIP to ensure the requesting site is allowed to access the resources. If so, the exporter component forwards the query to the Data Source Manager (DSM) component, which returns the results. Eventually the matching data source records are returned to the client.

Remote data sources can also be located using the push mode of operation of the resource awareness engine. For example, remote sites actively publish information about data sources through their local exporter components. The distributed job planner, or the DSM component that acts on behalf of the job planner, sends a subscription to its importer component. The importer component notifies other exporter components. Whenever matching data sources are published, exporter components actively push the matching data sources to the importer component and eventually to the client.

In one embodiment, the resource awareness engine provides the "pull" mode resource discovery by organizing the resource awareness engine components located on multiple sites into an overall hierarchy. The resource awareness engine component of each site chooses the resource awareness engine of another site as its parent. The two sites collectively form a tree structure. The hierarchy of the tree structure can naturally follow existing administrative relationships within an organization that owns multiple sites. This hierarchy can be used in a federated VO. Organizational peers, which are not subordinate to each other, negotiate among themselves and determine the hierarchy formation. This hierarchy formation is done in a cooperative VO. The exporter component at each site summarizes its resources, e.g., data sources, in aggregated forms and sends the summary to the importer component of its parent site. The aggregate resource summary is a condensed representation of the original resources, e.g., data source records, and supports attribute-based searching. The aggregate resource summary can take many different forms. For example, a histogram form can be used to summarize the DATA-RATE attributes of the video data sources of a site. Multi-resolution compression techniques can be used as well. A description of multi-resolution compression techniques is given in Deepak Ganesan et al., *Multi-resolution Storage and Search in Sensor Networks*, ACM Transactions on Storage, August 2005. The importer component of a parent site further aggregates the summaries from its children sites and sends these summaries up the hierarchy. Therefore, summaries are aggregated and propagated bottom-up through the hierarchy. The root resource awareness engine has a global summary of all the resources within the hierarchy, and each site has a branch summary of resources owned by its descendants.

The discovery of data sources initiates in the root resource awareness engine. An importer component from a client site sends a request to the importer component of a root site. The root site examines its own resources and the summaries of the resources of its children. The root site returns its eligible resources to the client and instructs the client to search the child branches of the root site that contain matching summaries. Through this mechanism, the client discovers eligible resources from all sites. In one embodiment, replication overlays are used to eliminate potential performance and failure bottlenecks at the root importer component.

The "push" mode of the resource awareness engine uses a semantic pub/sub system that matches events to subscriptions. Events are the semantic description of advertised resources in resource description framework (RDF) triples. Each triple has a subject, a predicate and an object and describes the relation between the subject and object. For example, Camera51 locatedIn NY indicates "Camera51" is located in "NY". A set of these triples can represent the semantic information of resources such as data sources. Subscriptions are RDF triple patterns. The RDF triple patterns are similar to triples, but some elements can be variables. ?x locatedIn NY represents any subject "?x" that is located in "NY". The semantic matcher receives events for resources from exporter components and subscriptions from importer components. The semantic matcher uses a semantic reasoner to deduce facts from ontologies, which contain formal representations of domain knowledge such as the location relationship of all cities and states in the U.S., and decides which events match to which subscriptions. An example of a semantic reasoner is described in J. Zhou, L. Ma, Q. Liu, L. Zhang, and Y. Yu. Minerva, *A Scalable Owl Ontology Storage and Inference System*, The First Asian Semantic Web Symposium (2004).

Failures can occur within exemplary cooperative data stream processing systems of the present invention in a variety of ways. Individual PEs or subjobs can fail. Various system components, both hardware, e.g., storage and computation nodes, and software, e.g., INQ, DSM, can also fail. The failure of components at a minimum causes the degradation of the capabilities of the site and at worst cause the failure of the entire site. Even partial failures of components can dramatically impact the capacity of a site.

Failure recovery is important both within a site and between sites. Given the ability to recover across sites, say from a checkpoint, the technology to recover within the same site also exists. Therefore, the emphasis is on cross-site or inter-site failure recovery, and the existence of certain intra-site failure recovery functionality is assumed when needed. Multi-site failure recovery requires mechanisms for supporting recovery and policies governing issues such as site selection and frequency of checkpoints.

Support of failover depends on the types of subjobs being executed. Many non-critical subjobs can be terminated under appropriate circumstances. These subjobs need no special support for recovery when the subjob or the nodes on which the subjobs run fail. Applications that are more important, yet not critical, can be restarted from scratch upon a failure without significant loss to users. A relatively small but critical fraction, however, should be resumed after a failure without loss of state. For these, failure recovery techniques are required. Suitable failure recovery techniques are known and available in the art and include process-pairs, for examples as described in Jim Gray and Andreas Reuter, *Transaction Processing: Concepts and Techniques*, Morgan Kaufmann (1992), and checkpointing, for example as described in Theo Haerder and Andreas Reuter, *Principles of Transaction-Oriented Database Recovery*, Readings in Database Systems (2nd ed.), pages 227-242, Morgan Kaufmann Publishers Inc., San Francisco, Calif., USA (1994). These techniques work well for recovering within a site. In addition, these techniques can be used to run critical applications on another site, either in parallel (process-pairs) or upon a failure (checkpointing). However, the overhead of maintaining the state across multiple sites will be substantially higher than within a more tightly-coupled site.

To handle failures of hardware system components, two mechanisms are available. The first mechanism is load shedding and rebalancing within one site. After a failure of some nodes, low-priority jobs can be killed or suspended to make room for high-priority ones. High-priority jobs can also be redistributed among the remaining nodes, thus rebalancing the workload on the functioning nodes. The second mechanism is inter-site offloading. If the workload of important jobs in a site exceeds the capacity of the remaining nodes, the site can shift some of its high-priority jobs to other sites. In one embodiment, the sites pre-arrange CIPs among them to determine which jobs to offload and how to offload these jobs. Executing in another site faces heterogeneity in available data sources, execution environments, competing execution priorities and other issues. Therefore, executing jobs on alternative sites preferably is used as a last resort. In rare instances, an entire site may fail as the result of a natural disaster such as floods or earthquakes or the simultaneous failure of each instance of a critical system component. The primary difference between partial and total site failure is that in the former case, the affected site can initiate recovery actions, while in the latter case, another site must detect and respond to the failure. The choice of which site (or sites) backs up a given site is negotiated in advance, based on the CIP(s). Critical data, such as the state necessary to run specific applications and the stored data upon which those applications rely, are copied to the backup site(s) in advance. Any applications that are critical enough to be checkpointed periodically or run in parallel via process-pairs are coordinated across the sites.

The CIPs between sites provide for significant flexibility in deciding how to respond to failures. A plurality of factors is considered in making this decision regarding how to respond to failures within the system. One factor looks at which site or sites should backup a given site. Some sites are excluded from serving in a back-up capacity due to either unwillingness or incompatibility. If multiple sites are available as satisfactory backups, a subset of these potential sites is identified. In one embodiment, site reliability and associated costs are taken into consideration when identifying the subset. The jobs or work associated with the failed site are divided among the sites in the identified subset. In addition, a determination is made regarding whether the assignment of backup sites is optimized by each site individually or decided for the benefit of a group of sites as a whole. The assignment of jobs will be handled differently in a federated VO versus a cooperative VO. Failure recovery or failure tolerance can also be provided through check pointing. For a given subjob, a determination is made about how often and under what conditions checkpoints should take place. In one embodiment, the current state is check pointed more frequently to support intra-site recovery than for inter-site recovery as checking pointing for inter-site recovery entails higher overhead costs. The decision regarding how often and how much back-up data to store weighs the need for a sufficient amount of reliable data against the storage limitations of each site and the ongoing storage needs of each site. For replicated persistent data, value-based retention interacts with the reliability of the data as described in Ranjita Bhagwan et al., *Time-Varying Management of Data Storage*, First Workshop on Hot Topics in System Dependability, June 2005. In addition, each extra copy of backed-up data takes space away from a site's own data, some of which may have only one copy.

Exemplary embodiments of the cooperative data stream processing system in accordance with the present invention manage the inherent heterogeneity of the multiple collaborating sites. Each site can have a different operating environment, in terms of the runtime environment, system type, security and privacy policy set, user namespace, among other aspects. These points of differentiation are managed to allow the sites to interoperate.

Each site within the cooperative data stream processing system has its own runtime environment, including PEs, stored data, and type system, with potentially different names, formats, functions or interpretation. For example, a first site uses a 5-character string for type the zip code, and a second site uses a full 9-digit zip code. In addition, a third site might not use the zip code at all. The present invention utilizes transformation and mapping rules as well as routines between sites to ensure that collaborative subjobs use PEs, stored data and types correctly across sites. In addition to inter-site variability in the representation and formatting of data, PEs, stored data and type systems evolve over time. The version of a given data set can differ from one site to another. Since subjobs using different versions of the same PE, stored data, or data types can co-exist, an evolution history is required. Suitable evolution histories use mechanisms such as versioning. The transformation and mapping should also handle such evolutions, both intra-site and inter-site.

Another source of heterogeneity among the sites are the security and privacy policies of each site. Collaborating sites can have identical or different security and privacy policies. When a single organization operates many sites, or all sites have high degrees of mutual trust and uniformity, a single security and privacy policy can be adopted under a common user namespace. The cooperative data stream processing system assumes either lattice-based secrecy, as described in Ravi Sandhu, *Lattice-Based Access Control Models*, IEEE Computer, November 1993, or integrity policy models, as described in IBM, Security in System S, http://domino.research.ibm.com/comm/research_projects.nsf/pages/system_s_security.index.html (2006). In one embodiment, each site within the system is provided with an understanding of the format and implied relationships of the security labels used by all sites within the system. The access rights and restrictions encoded within a security label are uniformly applicable throughout all the sites.

When multiple sites belonging to different organizations collaborate, however, uniform policies may not be feasible. In one embodiment, each site within the system defines its own security and privacy policies. All sites define secrecy levels and confidentiality categories for their subjects and objects; however, the numbers of secrecy levels, sets of categories and their meaning and interpretation vary from site to site. The user namespace also varies and can be completely separate from one site to another. In order to account for variations in security and privacy policies, policy translation and mapping are used. For example, in a collaborative hurricane response and recovery system, a given private organization uses two secrecy levels, public and organization-confidential, and no categories. A governmental agency, for example the Federal Emergency Management Agency (FEMA) dealing with the same situation uses four secrecy levels (unclassified, confidential, secret and top-secret) and a large set of categories, including a category Organization-NDA assigned to subjects to deal with organization-confidential information. The policy translation and mapping rules define that organization sites provide organization-confidential data only to agency subjects cleared to at least the confidential level and having the category Organization-NDA.

Figure 3:
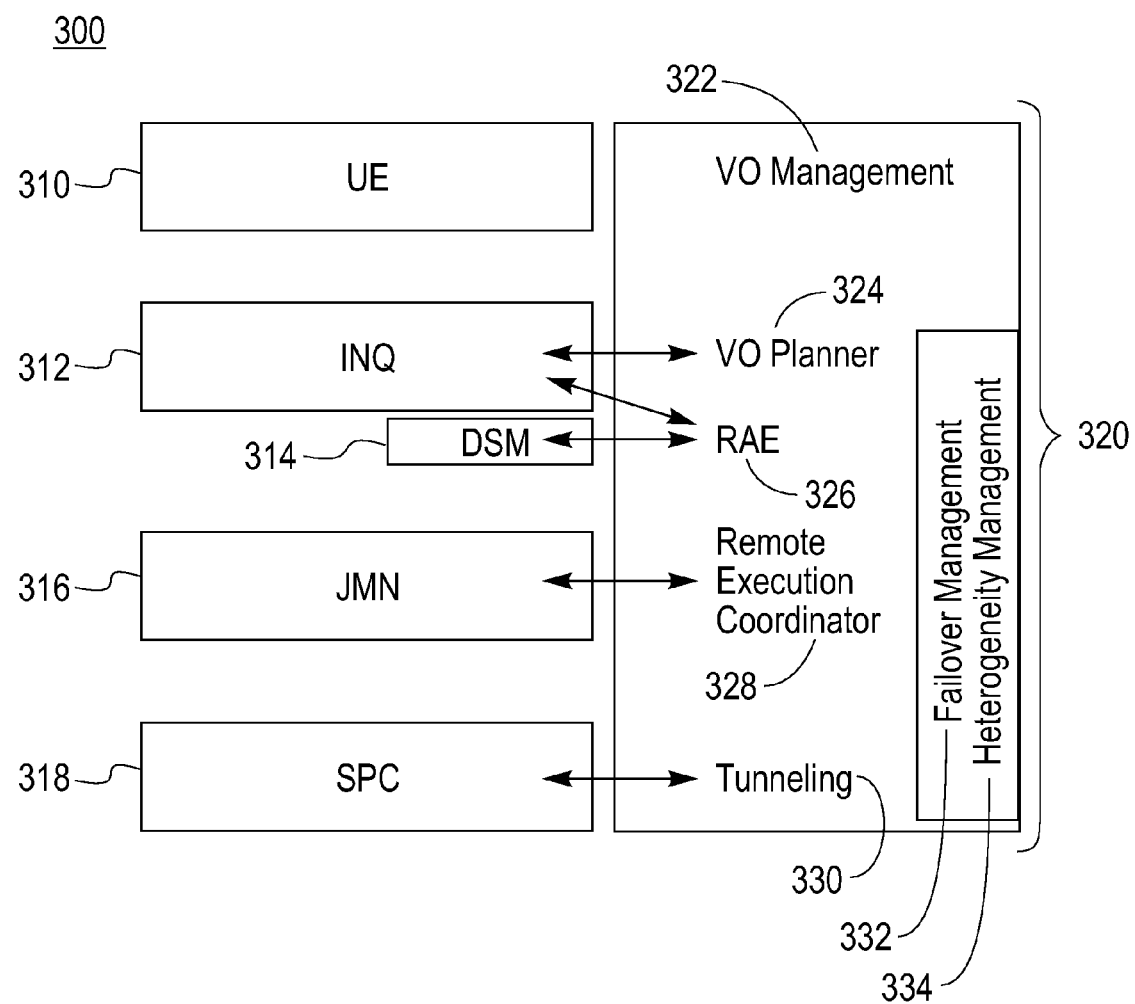
FIG. 3 is a schematic representation of the system architecture in combination with an embodiment of multi-site system functions.

An architecture was described above for the individual components supporting cooperation in the cooperative data stream processing system. Referring to FIG. 3, an exemplary embodiment of the functions that facilitate cooperation in combination with the system architecture 300 is illustrated. The plurality of functions 320 supporting cooperation are aligned with the architectural components to which each function relates. In one embodiment, each site runs an instance of each component of the architecture and employs the set of functions as illustrated.

A first function is VO management 322, which is utilized by the user experience component 310. VO management has the greatest degree of direct interaction with end users, for example site administrators. Included within VO management are CIP management for activating, deactivating and maintaining CIPs, VO membership management for tracking which sites are in a VO and the roles of each site within a given VO, agreement management for enacting agreements with other the sites and VO services including accounting and SLA monitoring. Administrators for each site and each VO interact directly with VO management to create and update CIPs.

The plurality of functions also includes a VO planner 324 that works with the INQ component 312 to facilitate inter-site planning. The VO resource awareness engine (RAE) provides information about available resources and interacts with DSM 314 as well as the INQ component 312. The remote execution coordinator (REC) 328 extends JMN layer 316 to the multi-site case by supporting distributed jobs. The tunneling function 330 extends the data fabric component of the stream processing core (SPC) 318 across sites by transmitting data from a PE on one site to a PE on another. In addition to functions that integrate with one of the layers in the system architecture, the plurality of functions 320 also includes functions that interact with multiple components in the core, i.e., single-site, architecture. The VO failover management (FM) 332 handles backup site arrangements, check pointing and recovery after failure. In addition, VO FM 332 incorporates heartbeat management (not shown) for tracking the availability of sites. The VO heterogeneity management (HM) 334 function manages the mapping and translation for types, schemas, ontologies and security and privacy labels, among others.

The components and associated functions illustrated in FIG. 3 are replicated on each site within the system. In addition, the various components can appear as either a participant or a lead within a VO. Participants interact with other components on a site and relay various requests to the leads for processing. For example, in a federated VO, a federated plan lead component takes an inquiry, builds a distributed plan and invokes appropriate components on each participating site to deploy that part of the plan.

Figure 4:
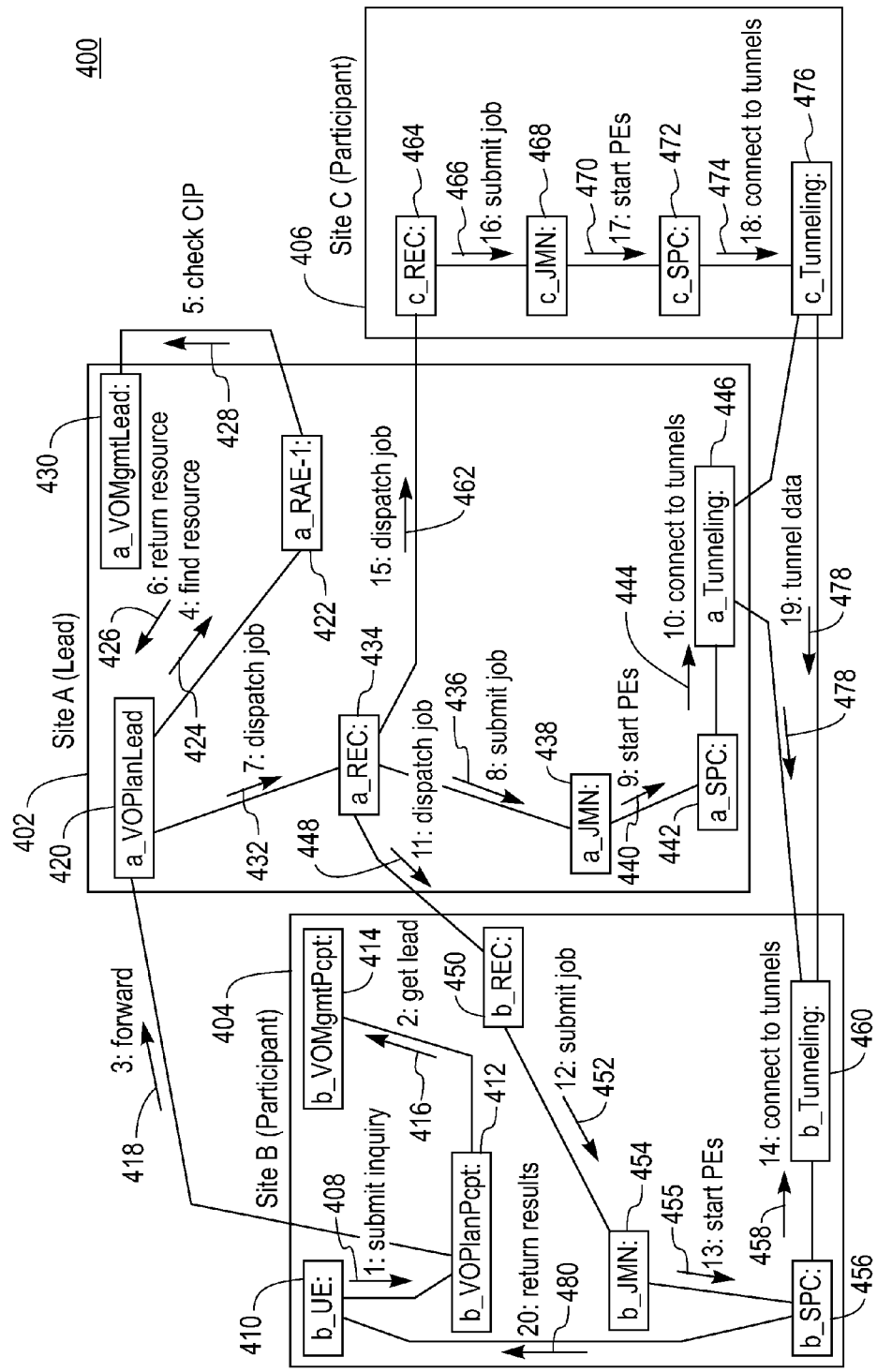
FIG. 4 is a schematic representation of an embodiment of inquiry processing using the cooperative data processing system of the present invention.

Referring to FIG. 4, an exemplary embodiment of a distributed planning scenario 400 within a federated VO using SLAs in accordance with the present invention is illustrated. The federated VO includes a lead site 402, a first participant site 404 and a second participant site 406. An inquiry 408 is submitted from the instance of the user experience (UE) component 410 on the first participant site 404 and is received by the instance of the VO plan participant 412 on the same site. The VO plan participant 412 obtains from the VO management participant the identification of a plan lead 416 for the submitted inquiry and forwards the inquiry 418 to the VO plan lead 420 on the lead site 402. The VO plan lead examines the inquiry and sends a resource request 424 to the VO RAE-I 422 for information about where appropriate resources are available. The VO RAE-I 422 sends a request to check the CIP 428 to the VO management lead 430 to determine whether the CIP allows particular resources to be shared. The VO RAE-I 422 returns a list of appropriate resources 426 to the VO plan lead 420. The appropriate resources are available for use for plan inclusion. From this list of possible resources, the VO plan lead 420 chooses providers for needed resources, and dispatches the job 432 to the remote execution coordinator (REC) 434 on the lead site 402. The REC 434 on the lead site recognizes and separates the portions of the job that are destined for execution on other sites within the VO. The job portion that is destined for execution locally on the lead site is submitted to the local JMN 438 for execution. The local JMN 438 starts the PEs 440 using the local SPC 442 on the lead site. These PEs are connected to the tunnels 444 using the tunneling function 446 local to that site to return SDOs to the sites accessing them. Some of the above described details may vary in other embodiments. For example, a DSM component may send resource requests on behalf of the VO plan lead to retrieve data source information, and the VO plan lead asks its DSM for both remote and local data source information.

A similar job submission sequence is repeated once for each remote or participant site. For the first participant site, the REC 434 on the lead site 402 dispatches the appropriate the job portion 448 that is destined for execution on the first participant site 404 to the REC 450 on the first participant site. This REC submits the jobs 452 to its local JMN 454 for execution. The local JMN 454 starts the PEs 455 using the local SPC 456 on the first participant site. These PEs are connected to the tunnels 458 using the tunneling function 460 local to that site to return SDOs to the sites accessing them. Similarly, for the second participant site 406, the remote execution coordinator (REC) 434 on the lead site 402 dispatches the appropriate the job portion 462 that is destined for execution on the second participant site 406 to the REC 464 on the second participant site. This REC submits the jobs 466 to its local JMN 468 for execution. The local JMN 468 starts the PEs 470 using the local SPC 472 on the second participant site. These PEs are connected to the tunnels 474 using the tunneling function 476 local to that site to return SDOs to the sites accessing them. The SDOs are tunneled 478 as they are produced through to the site originating the inquiry. The SPC 456 on the first participant site, i.e. the site originating the inquiry, returns results 480 to the user as the results are obtained.

Interoperation among a plurality of sites within a given cooperative data stream processing system of the present invention requires distributed planning among the sites, inter-site and intra-site resource awareness and distributed execution and failure recovery. With regard to distributed planning, a VO planner is implemented that can utilize data sources and PEs from each one of the plurality of sites in the VO and that can produce distributed plans. The VO planner accepts inquiries that describe the desired final results in inquiry specification language (ISL). In one embodiment, the semantic description of the content of remote data sources and the required input and output streams of PEs are represented using a Web ontology language (OWL) files as described, for example in W3C Recommendation, Web ontology language (OWL), February 2004. These OWL files are replicated at the site containing the VO planner. Since the semantic descriptions are relatively static, these files do not change frequently. When a site joins a VO, that site can copy these files over to the site for the VO planner site.

The VO planner, having received the inquiries, optimizes and balances between multiple objectives such as quality of results, resource utilization, security risks, communication delay and bandwidth between sites in order to plan the execution of the inquiries. An example of suitable planning is described in Anton Riabov and Zhen Liu, *Planning for Stream Processing Systems*, Proceedings of AAAI-2005, July 2005. In one embodiment, multiple Pareto-optimal distributed plans are produced in the form of flow graphs, which consist of PEs and data sources interconnected together. These plans have different performance vs. cost tradeoffs and can be provided to either the user or a distributed scheduler to decide which plan to deploy. The VO planner partitions the chosen plan into a plurality of sub-plans. Each sub-plan is assigned to a site within the cooperative data stream processing system for execution. The VO planner also inserts tunneling PEs into the sub-plans. These tunneling PEs handle inter-site transport of data streams.

Implementations of the resource awareness engine allow any site within the cooperative data stream processing system to discover desired information, for example, available data sources, PEs and resources, from other sites within a common VO. In one embodiment, a pull mode is used to discover the desired information. The pull mode utilizes two components, a server and a resolver. The server functions as the exporter. An instance of the server resides at every site and produces summaries about information at that site. The resolver functions as the importer. A client, e.g., a VO planner or its DSM acting on behalf of the planner, requesting information sends the appropriate query to its local resolver. By checking the CIP, the resolver knows which one of a plurality of servers is the root server. The resolver forwards the request to the root server, which directs the resolver to search through the server hierarchy. In one embodiment, replication overlays are used in addition to the hierarchy to avoid a bottleneck at the root server and to increase the speed of the search. Therefore, a given server within the hierarchy replicates the branch summaries of its siblings, its ancestors and its ancestors' siblings. Upon receiving a query, a server evaluates the query against replicated summaries and directs the resolver to search corresponding remote servers when matches are identified. Such replications let each server receive summaries that combine together to cover the whole hierarchy. Therefore, the resolver can send the request to any server.

In one embodiment, a push mode is used to discover the desired information. The push mode includes three modules, the match server, the subscriber acting as importers and the publisher acting as exporters. The match server provides three functions to subscribers—subscribe, unsubscribe and renew. Each subscription has an associated lifetime. After the lifetime expires, the associated subscription is removed from the system. In one embodiment, the subscriber submitting the subscription specifies the associated lifetime. In addition, the subscriber can renew the lifetime of a previous submitted subscription. In one embodiment, a single centralized server handles all subscriptions and matches published events against existing subscriptions.

The single centralized server optimizes the matching for a plurality of subscriptions by exploiting the common triples in the subscriptions. When several subscriptions all have the same triples, for example, ?x locatedin NY, the centralized server reasons once and uses the intermediate results for all subscriptions. The centralized server maintains a mesh of distinct triple patterns from all subscriptions. The distinct triple patterns in the mesh are ranked selectivity, i.e., how many potential triples match a given triple pattern, and popularity, i.e., how frequent a given triple pattern appears in subscriptions. An order of evaluation of the triple patterns is determined that minimizes matching response time. As existing subscriptions expire and new subscriptions are submitted, the ranked mesh is updated accordingly.

Figure 5:
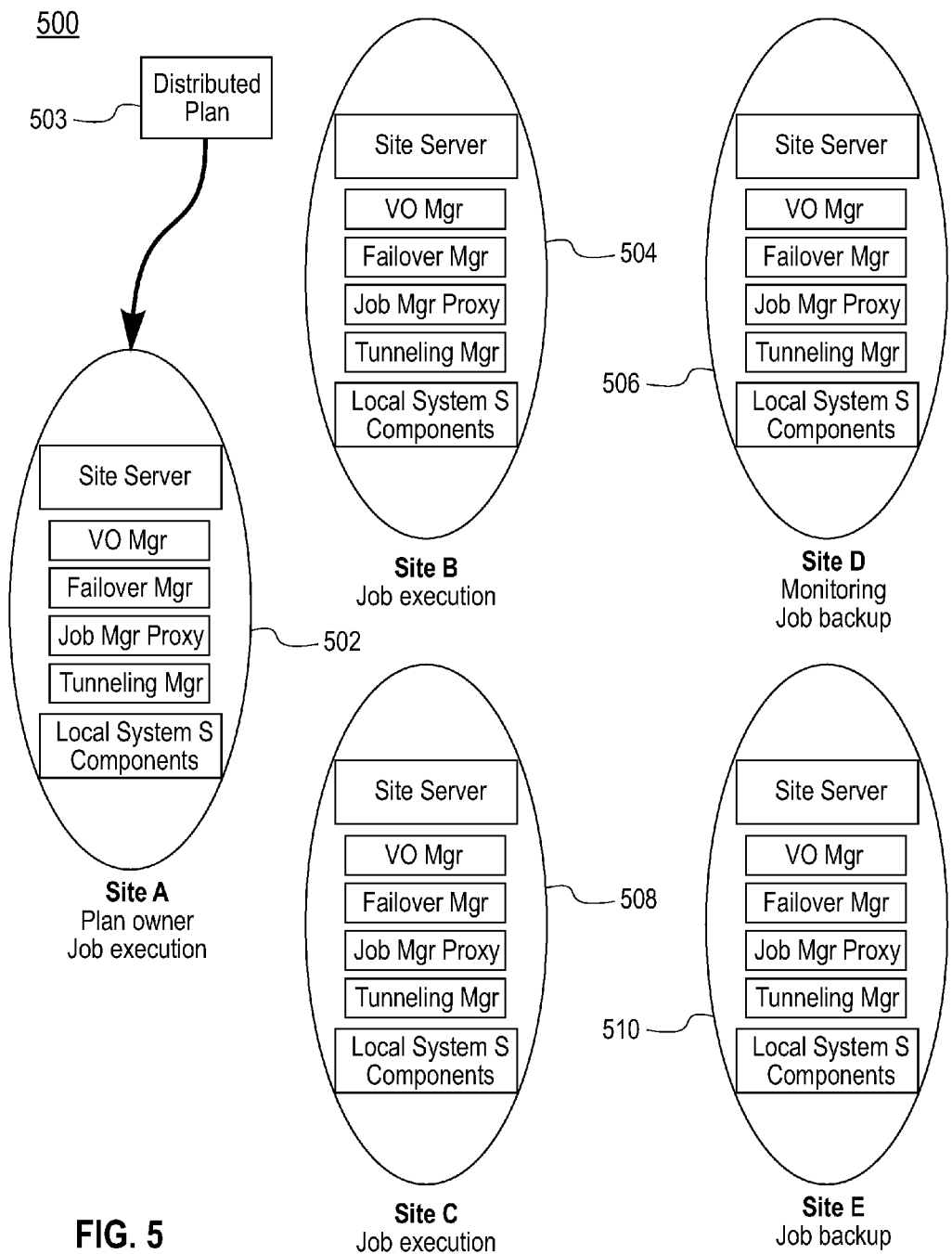
FIG. 5 is a schematic representation of an embodiment of site arrangements to provide for inter-site system failover.

In one embodiment, monitoring and recovery are provided for cooperating stream processing jobs distributed across multiple sites. Individual job failures within a single cooperative data stream processing system site are recoverable within that site. However, a failure of an entire site requires distributed support. Referring to FIG. 5, an exemplary embodiment of a site failover arrangement 500 for use with the cooperative data stream processing system in accordance with the present invention is illustrated. As illustrated, the cooperative data stream processing system includes five sites. These five sites work cooperatively to execute a distributed plan for supporting failure recovery. Each site provides one or more of a plurality of functions for failure recovery. A first site 502 functions as the failure recovery plan owner. The distributed plan 503 is communicated to the plan owner site 502, and the plan owner site drives the execution of the distributed plan job execution. A second site 504 and a third site 508 provide for job execution by hosting jobs that are part of the distributed plan, and a fourth site 510 provides for job backup to host jobs from failed job execution sites. A fifth site 506 provides monitoring of other sites for site failure. Some of the sites can provide more than one function. For example, the first site functions as the plan owner and as the execution site for some of the jobs included in the plan. Similarly, the fifth site 506 monitors the execution sites and functions as a backup execution site. The input to the five sites is the representation of a distributed plan 503, which is assumed to be executing to satisfy an inquiry entered by a user of the cooperative data stream processing system. The distributed plan describes how the inquiries are divided into individual jobs that will run on the different sites within the system.

In one embodiment, each site contains a single instance of the components of the architecture of the cooperative data stream processing system. In addition each site, in order to support distributed operation, includes a site server, a VO manager, a failover manager, a job manager proxy, a tunneling manager. The VO manager manages the sites that are available to play monitoring and backup roles in support of the distributed plan. In addition, the VO manager manages agreements between sites. The failover manager chooses the specific sites to assume monitor and backup roles and orchestrates the monitoring and notification of site failures between the sites. The job manager proxy is a wrapper around the JMN component of the cooperative data stream processing system, allowing jobs to be invoked remotely from other sites. The tunneling manager provides the mechanism to transport data streams between sites.

In one embodiment, the distributed plan is interpreted by a site within the system that will drive the execution of the plan and that will act as the plan owner. This site can be a lead site in a federated VO or a peer site in a cooperative VO that has taken on a leadership role for this distributed plan. The set of sites that will function as the job execution sites are specified in the distributed plan. Next, the monitoring sites that will monitor the health of the job execution sites are chosen. This selection can be hard programmed into one or more sites or can be selected, for example using the VO manager located on the plan owner site. This VO manager checks for sites that are willing to provide monitoring capability according to the CIP associated with the VO. Specific sites are chosen through interaction between the failover manager on the plan owner site and failover manager counterparts on other sites. Agreements to monitor are created between the plan owner site and the VO managers of the monitoring sites. The selection of job backup sites that take over the execution of critical jobs upon a site failure is made through methods similar to the selection of monitoring sites. In one embodiment, the selection of backup sites is made ahead of time in advance of a site failure. Alternatively, the selection is deferred until a failure occurs, and backup sites are chosen on demand. Agreements to backup are also obtained from these sites. In one embodiment, site selection utilizes an intelligent algorithm as described for example in Bin Rong, Fred Douglis, Zhen Liu and Cathy Xia, *Failure Recovery in Cooperative Data Stream Analysis*, The Second International Conference on Availability, Reliability and Security, ARES (2007).

In preparation for the execution of the distributed failover plan, heartbeat monitoring is initiated by the failover managers on the appropriate sites. In addition, the tunneling managers on the appropriate execution sites are alerted to prepare for tunneling in accordance with the tunneling requirements defined in the distributed failover plan. Because the distributed failure plan has broken the logical plan into disjointed fragments, the tunneling requirements tell the tunneling managers how to associate the tunneled streams to the PEs on their respective sites. Separate jobs are deployed by the tunneling manager instance located on each site involved to provide the necessary tunneling support. In further preparation, the actual jobs that implement the distributed failover plan are deployed to the sites that will host those jobs. The plan owner site uses the job manager proxy instance located on each of the hosting sites to deploy the jobs. Upon successful initiation of these jobs, the execution of the distributed plan begins. Data flow between PEs on each hosting site, and these PEs perform their analysis on the data. Data streams also flow from certain PEs on one originating site through tunnels to other destination sites and are routed to the appropriate PEs on these destination site. In addition, the subjobs that constitute the distributed plan are able to optionally checkpoint state that may be used later in order to recover from a failure.

When an execution site fails, the failure is detected through the heartbeat monitoring performed by the monitoring site responsible for this execution site. In one embodiment, the failover manager instance on the monitoring site notifies the failover manager instance on the plan owner site of the failure. The plan owner site works to recover any critical jobs that were executing on the failed site. In one embodiment, the owning site uses its representation of the distributed plan and initially halts any tunneling that involves the failed site. The sites that were exchanging data with the failed site are informed to stop all tunneling activity with the failed site. New monitoring agreements are created for monitoring, if necessary, and heartbeat monitoring is initiated on the backup sites. The tunneling manager instances on new, i.e., backup, execution sites and on the execution sites affected by this site failure are notified to prepare for tunneling, resulting in new or reconfigured tunneling jobs. The critical jobs from the failed site are deployed to one or more backup sites, and the execution of these jobs is resumed on these sites. In one embodiment, the execution of these jobs is resumed by reading checkpointed state from distributed storage. The distributed plan is now restored to its intended state. In one alternative embodiment, the failure notification is configured to directly notify the backup sites, allowing these sites to initiate recovery. In this embodiment, there is no plan owner other than the site that failed. Therefore, instead of running a job having an owner, which spawned it, a backup site has the information to recover a failed job even though it did not initiate the job earlier.

In the context of site failure for sites running subjobs or applications, each subjob needs to be restarted on another site. Therefore, the tunnels associated with the subjobs needs to be re-established. Tunnels are reestablished as a result of a failure in the pair of sites associated with that tunnel. These failures include total and partial failures of one or both of the sites within the pair of sites. Therefore, reestablishment of the tunnel can involve one or more new sites depending on the type and extent of failure. In one embodiment, to configure and recover tunnel sink jobs, the REC on the new execution site may in one embodiment be informed by the owning site of the connection information, e.g., IP address and port) for the corresponding tunnel source jobs. Alternatively, it may query the owning site for the connection information. For the recovery of tunnel source jobs, the REC deploys such jobs and notifies the REC of the owner site about their connection information. The failover manager at the owner site will inform other execution sites to terminate tunnel sink jobs that send streams to the failed site. These tunnel sink jobs will be restarted using the new connection information of the recovered tunnel source jobs.

The cooperative data stream processing system architecture supports multiple cooperation paradigms, including federated and cooperative (peer-to-peer) VOs. In addition, hierarchical layers of VOs provide arbitrary scalability. The distributed planning component of the cooperative data stream processing system is significantly more elaborate and flexible than the Grid models. Failure recovery utilizes other sites to survive both partial and total site failures and to enable critical processing to continue. Unlike Grid computing, the cooperative data stream processing system is intended to run under a state of overload and, potentially, to drop processing or data as dictated by overall system priorities.

The cooperation among cooperative data stream processing system sites encompasses a variety of interaction models, from loosely coupled to tightly integrated. These various models address different levels of cooperation needs of sites with varying degrees of trust relationship, and inter-site heterogeneity. The cooperative data stream processing system supports generic application-specific processing rather than database operations, a more difficult problem due to higher complexity, development costs and times to completion. A discussion is found in Michael Stonebraker, Ugur çetintemel, and Stanley B. Zdonik, *The 8 Requirements of Real-Time Stream Processing*, SIGMOD Record, 34(4):42-47 (2005). Moreover, the cooperative data stream processing system has an Inquiry Specification Language that allows users to specify application declaratively at the semantic level, allowing users focus on application level tasks, rather than deal with the complexity of finding the optimum set and interconnection of data sources and PEs. With regard to failure recovery, the cooperative data stream processing system emphasizes policies such as optimizing the selection of backup sites, providing a balance between the goals of different sites and incorporating existing underlying failure recovery mechanisms.

To support the distributed processing of jobs in the cooperative data stream processing system, exemplary embodiments in accordance with the present invention provide for inter-site communication of data streams. As was described above, the cooperative data streams processing system receives user-defined inquiries from which the system derives one or more distributed jobs (alternatively, distributed jobs can be hand-crafted by a developer). These distributed jobs consist of a set of sub-jobs that run as ordinary jobs at a single site. Each sub-job consists of processing elements that are deployed on nodes within one site within the system. Therefore, the sub jobs or processing elements of a given distributed job can be deployed concurrently on two or more sites within the system. These processing elements, being part of a single distributed job derived from a given inquiry, will need to send data to one another, i.e. derived data from a first processing element on a first site may be needed by a second processing element on a second site. In addition, processing elements from different distributed jobs may need to share data. In another scenario, a given processing element may be deployed on a first site because the first site has the capacity or processing resources required for that processing element; however, the given processing element may need a primal data source from a second site. In all of these scenarios, either primal or derived data are transferred between pairs of sites specifically for a processing elements located on those sites. Therefore, in communicating data streams between sites, exemplary methods in accordance with the present invention direct the transported data streams between the appropriate PEs on the sites. By directing the data streams from the PEs on an originating site to the PEs on a destination site, the structure of the distributed processing graph of the cooperative data stream processing system is supported.

As stated above, any data stream processing application containing PEs can distributed across multiple sites within the system as a result of distributed planning. In one embodiment, decisions regarding the distribution of PEs are made at runtime, i.e., at the time a given distributed plan is generated. The result is that the flow graph associated with the data stream processing application is broken into a plurality of segments that run at the individual sites. Cooperative data stream processing systems in accordance with the present invention utilize a tunneling mechanism between sites to tie together the data stream flow that needs to occur between these segments. Because distributed plans and the required tunneling are determined at run-time, the stream application is not aware of the tunneling, i.e., the stream application is not written in a way that is cognizant of the way that it may be broken up, distributed and tied together with data tunnels.

Figure 6:
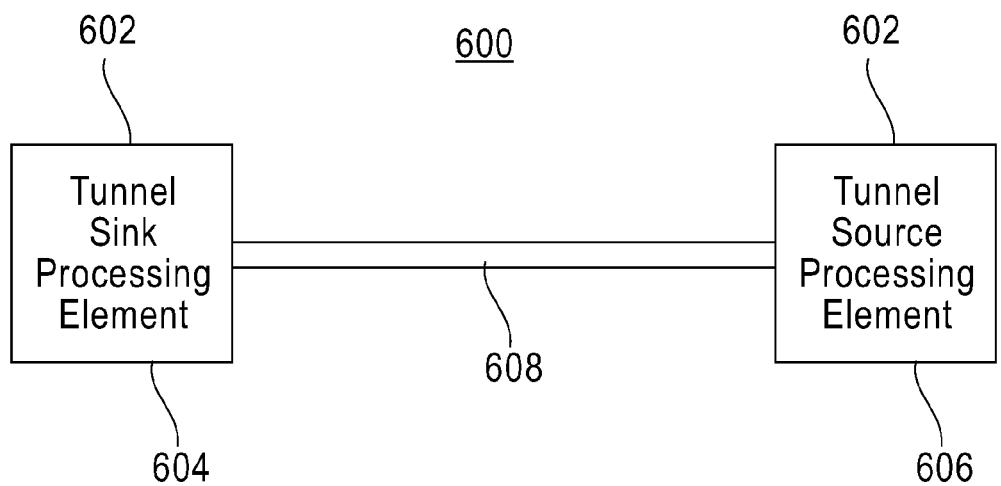
FIG. 6 is a schematic representation of an embodiment of a tunnel path for use in communicating data streams between sites in accordance with the present invention.

In one embodiment, the tunneling mechanism takes any data stream as input on an originating site and produces the identical stream as output on a destination site. To eliminate the need for modifications to the actual data stream processing applications in order to transport the required data streams, PEs are used as part of the tunneling mechanism. Since PEs are part of the programming model for the data stream processing applications, these application PEs naturally integrate with the PEs that make up the segment of a stream application that runs on a particular site. Referring to FIG. 6, an exemplary embodiment of a tunnel 600 for use in transporting data streams between two sites is illustrated. The tunnel includes a pair of PEs 602 arranged to support tunneling. Each one of the PEs is disposed in one of a pair of sites to be connected by the tunnel for data stream exchange. The first PE is a tunnel sink PE 604. The tunnel sink PE encapsulates the sending end of a data tunnel. Data streams flow into the tunnel sink PE on the originating site. The tunnel sink PE does not produce any output streams on the originating site. Instead, the data from these streams is sent through the tunnel to the appropriate destination site. The second PE is the tunnel source PE 606. The tunnel source PE encapsulates the receiving end of a data tunnel and is disposed in the destination site. No input streams flow into the tunnel source PE on the destination site. Instead, data originating from the originating site is received through the tunnel and is converted to a set of output streams from the tunnel source PE. The tunnel also includes a network connection 608 that is in communication with both the tunnel sink PE and the tunnel source PE. Any suitable network connection capable of transporting data between sites can be used.

Although tunneling PEs can be created that are specific to the types of data streams being communicated, preferably the implementation of the tunneling PEs is generic with respect to the types of data streams that are transferred. For example, any type of Stream Data Object (SDO) can be handled by a given tunneling implementation. Therefore, the same tunneling PE implementation, or even the same PE instances, can be used to transfer SDOs of different types and different stream subjobs.

In one embodiment, a tunnel is established between a given pair of sites selected from the plurality of distributed, independent sites contained within the cooperative data stream processing system. The number of tunnels, and hence the number of tunneling PEs located on each site, for a given pair of sites, can be varied. Tunnels can be unidirectional or bidirectional and can be job specific or generic. In one embodiment, a separate tunnel using a set of tunneling PEs is created for each instance of cross-site data stream flow in a distributed plan involving a given pair of sites. Each established tunnel can be unidirectional or bidirectional. In one embodiment, a plurality of unidirectional tunnels is created between a given pair of sites that are involved in multiple types of data flow. In another embodiment, a single tunnel is created between any given pair of sites that need to transfer data streams. This single tunnel is used to transport any of the data streams required to go between the two sites for any number of distributed jobs or processing elements that are deployed on that pair of sites. The tunnel is bidirectional and utilizes gateway PEs, one gateway PE in each of the sites associated with the tunnel. In this embodiment, the data stream transfers are multiplexed over a single tunnel, and the single set of gateway tunneling PEs associated with the tunnel create a "gateway" between the sites. Using a single tunnel minimizes the number of network connections used, as creating a tunnel for each distributed job or processing element associating the job can result in an excessive number of network connections. In addition, the use of single tunnels between site pairs minimizes the number of tunneling PEs used in the system. In another embodiment, the tunnels are not bidirectional; however, a new tunnel or pair of tunnels is not created for each distributed job. In this embodiment, a single tunnel is established for each direction of data flow between the sites. Therefore, any given pair of sites would have two unidirectional tunnels. Each unidirectional tunnel would utilize source and sink PEs on the appropriate sites depending on the data flow direction associated with that tunnel. In one embodiment, data streams flowing through a given tunnel are prioritized with respect to one another. Since cooperative data stream processing systems in accordance with the present invention often run in a state of overload, prioritizing data processing and other work improves system throughput, with lower priority work being deferred or even abandoned. The single tunnel arrangement minimizes the startup latency encountered when multiple network connections are used, by reusing an existing connection.

Figure 7:
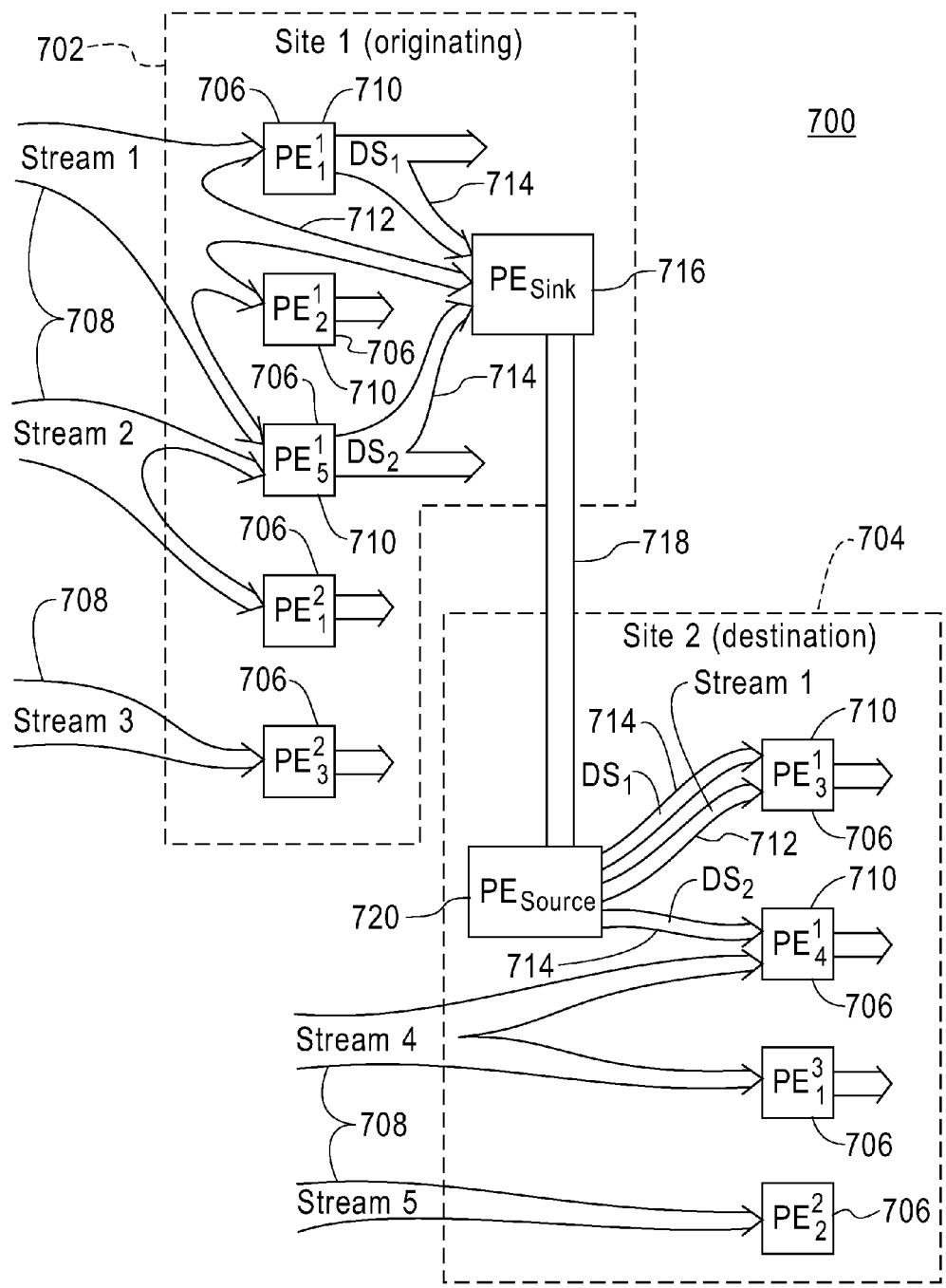
FIG. 7 is a schematic representation of an embodiment of a pair of sites using a tunnel path to communicate data streams in accordance with the present invention.

Referring to FIG. 7, an exemplary embodiment of a pair of cooperating sites utilizing a tunnel to exchange data streams 700 in accordance with the present invention is illustrated. In accordance with an embodiment of method for using tunneling for inter-site data stream communication, a pair of sites from the plurality of sites in the cooperative data stream processing system is identified. The sites are identified as an originating site 702 and a destination site 704. Each site in the pair of sites includes applications processing elements 706 on nodes within the site. The application processing elements are associated with jobs derived from user-defined inquiries submitted to the system. Each processing element is in communication with one or more data streams 708. The application processing elements on a given site can be associated with a variety of jobs. As illustrated the originating site includes three application processing elements 710 associated with a first job, and the destination site also includes two application processing elements 710 associated with the first job. Therefore, the first job has been deployed on the originating site and the destination site as a distributed job. The application processing elements associated with the first job and deployed on the destination site have need of data streams from the originating site, both primal data streams 712 and derived data streams 714. Tunneling mechanisms in accordance with the present invention as used to exchange the required stat streams.

Although illustrated for a single tunnel between a single pair of sites, this method is applicable to multiple tunnels including tunnels that are created on-demand and tunnels that are created in accordance with a prescribed distribution plan. In one embodiment, the tunnel including the corresponding network connection is pre-established between the pair of sites expected to be involved in the transfer of data associated with the first job. Alternatively, the tunnels are established as needed, on-demand. A tunnel sink processing element 716 is deployed on the originating site, and a tunnel source processing element 720 is deployed on the destination site. In one embodiment, the establishment of the tunneling PEs is driven by a lead site in a VO. Alternatively, one of the sites within the system is designated for establishing tunnels. The originating and destination sites are notified individually of the tunneling relationship associated with the deployed job. A network connection 718 is established between the two sites in communication with the sink processing element and the source processing element. In one embodiment, the pair of sites using a handshaking process to establish a network connection. In general, any mechanism suitable for making a network connection can be used. When a single, bidirectional tunnel is established between a given pair of sites that utilizes a gateway PE on either end of the tunnel within each site, each gateway PE is deployed before deployment of the subjobs and the establishment of data stream transfers, for example as part of the general set-up of the system. The establishment of the gateways PEs is independent of any given job or subjob. The gateway PEs maintain a persistent connection between themselves and receive tunneling control information to initiate or terminate data stream transfers over the tunnel on demand.

In one embodiment, a planning component creates a distributed plan for job execution involving multiple sites. This distributed plan is not translated into one or more distributed jobs that need to run on each site but also includes definition of the tunneling requirements of the distributed plan. Each tunneling definition includes a description of the tunneling path, i.e., the logical data flow of a stream between application or subjob PEs located on different sites in the distributed plan. The tunneling path definition includes an identification of the originating site and destination site, and identification of the originating application processing elements and the destination application processing elements, an identification of the data streams that need to flow across a tunneling path and an indication of the priority associated with the transfer of the data streams.

In one embodiment, the lead execution site for the distributed job, i.e., the site driving the execution of the plan, uses the definition of the tunneling paths supplied by the planner to notify the sites involved to prepare for their role in tunneling, either the originating site, destination site or both the originating and destination sites. The tunneling path definitions are communicated to each site in the pair of sites. Each site in the identified pair of sites uses the information in the tunneling path definition to dynamically configure the flowspecs of the tunneling PEs and the application PEs where necessary by either sending PE events, or through explicit PE APIs. This configuration allows the necessary data streams to flow through the tunneling PEs, by establishing data flow relationships to the appropriate application PEs on each site.

Once the application PEs are appropriately connected to the tunneling PEs, data streams flow within the sites as usual per the cooperative data stream processing system. In addition, data streams flow between the pair of sites per the established tunneling mechanism. In order to transport data streams through the tunnel, the data streams are changed from a stream format to a network representation. In addition, the data streams are modified to account for heterogeneity between the originating site and the destination site. For example, data types are transformed according to a set of transformations associated with data heterogeneity mapping rules defined in the CIP shared by the sites. Changes in the data streams can also be made to account for security differences between the sites. In one embodiment, a set of security transformations associated with security heterogeneity mapping rules are performed on the data streams as defined in the CIP shared by the sites. This includes association of data objects with certain security categories, and upgrading/downgrading data integrity attributes.

The same basic steps for tunneling are done for every distributed job and continue until sites are told to stop tunneling for a particular distributed job. When this occurs, flowspecs are reconfigured as described above to stop the flow of data streams associated with a particular distributed job. Therefore, in addition to the creation of tunnels, tunnel flows can be modified or terminated. In one embodiment, when a given PE consumes SDOs slowly, the incoming queue associated with that PE will become full. Eventually, the PE cannot receive any new SDOs from its producing PE. When reliable transport is used to send SDOs among PEs, the producing PE will have to stop producing more SDOs and wait for the consuming PE to finish processing SDOs. The producing PE, similarly, can cause some of its upstream producer PEs from which it receives SDOs to stop and wait. This communication up through PEs is referred to a backpressure and propagates in the reverse direction of data flow.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for inter-site communication of data streams in a cooperative data stream processing system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for inter-site communication of data streams in a cooperative data stream processing system, the method comprising:

identifying a plurality of distributed sites, each site comprising one or more nodes and independently hosting on the nodes jobs derived from inquiries to process continuous dynamic streams of data; and using a processor located on one or more of the plurality of distributed sites to perform the steps of:

breaking each job into a plurality of processing elements, each processing element comprising a portion of a data stream processing application and the processing elements for a given job utilizing a data stream flow comprising the continuous dynamic streams of data that is communicated through the processing elements of that given job to mine the continuous dynamic streams of data;

grouping the processing elements into subjobs;

executing the subjobs on nodes comprising computing systems within two or more of the plurality of distributed sites;

identifying tunneling processing elements in a given pair of the distributed sites containing nodes on which processing elements derived from the given job are executing, each tunnel processing element comprising an executable application compatible with the processing elements derived from the given job and executing on its distributed site to maintain the data stream flow communicated through those processing elements;

establishing at least two tunnels between the given pair of nodes, each node located on one of the distributed sites by establishing communication between the tunneling processing elements located on each node in the given pair of nodes across a network connection between the given pair of sites to exchange the data stream flow between the tunneling processing elements and the processing elements, the tunnel associated with the given job by creating a distributed plan comprising definitions of required tunneling flows comprising:
  an identification of an originating site in the pair of sites and a destination site in the pair of sites;
  an identification of originating site application processing elements to be involved in data stream flow transfer and an identification of destination site application processing elements to be involved in data stream flow transfer;
  an identification of data stream flows to be exchanged through the tunnel;
  security and privacy labels associated with each data stream flow to be exchanged;
  type mappings associated with each data stream flow to be exchanged; and
  a priority associated with each data stream flow to be exchanged;
using the tunnels to route the data stream flow between the given pair of sites and through processing elements of the given job as required to process the given job by mining the continuous dynamic streams of data; and
transforming the data stream flows to compensate for heterogeneity between the pair of sites, the heterogeneity between the pair of sites comprising security, data type and data semantic differences between the pair of sites.

2. The method of claim 1, wherein the step of establishing a tunnel further comprises:
  establishing the network connection between the pair of distributed sites;
  deploying a tunnel sink processing element on an originating site in the pair of sites and in communication with the network connection, the tunnel sink processing element capable of sending the data stream flow from the originating site across the network connections to a destination site in the pair of sites; and
  deploying a tunnel source processing element on the destination site and in communication with the network connections, the tunnel source processing element capable of receiving the data stream flow sent across the network connections by the tunnel sink processing element.

3. The method of claim 1, further comprising reestablishing the tunnel using at least one new site selected from the identified plurality of distributed sites following a failure in the given pair of distributed sites.

4. The method of claim 1, wherein:
  the step of establishing the tunnel between a given pair of distributed sites further comprises establishing a new tunnel between the pair of sites for each instance of data stream flow between the processing elements deployed to the pair of sites.

5. The method of claim 1, wherein the step of establishing the tunnel between a given pair of distributed sites, further comprises establishing a single tunnel between the pair of sites for the exchange of all data stream flows associated with any distributed jobs run on the pair of sites.

6. The method of claim 1, wherein the step of establishing the tunnel between a given pair of distributed sites, further comprises establishing the tunnel in response to the identification of a distributed job to be executed on the pair of sites.

7. The method of claim 1, wherein the step of establishing a tunnel path comprises establishing a plurality of tunnels and the distributed plan comprises definitions for a plurality of tunnel flows.

8. The method of claim 1, wherein the step of establishing a tunnel path between a given pair of distributed sites further comprises:
  notifying the identified originating site and the identified destination site regarding the distributed plan; and communicating definitions of the required tunnel flows to the originating site and the destination site.

9. The method of claim 1, wherein the step of establishing a tunnel between a given pair of distributed sites further comprises establishing data flow relationships between application processing elements and a tunnel sink processing element running on the originating site; and application elements and a tunnel source processing element running on the destination site in accordance with the tunnel flow definitions to facilitate exchange of the data stream flows.

10. The method of claim 1, wherein the step of using the tunnel to exchange data stream flows between the given pair of sites further comprises changing the data stream flows from a stream format associated with the continuous dynamic streams of data to a network presentation suitable for a network containing the plurality of distributed sites.

11. The method of claim 1, further comprising terminating the use of the tunnel to exchange data between the pair of sites.

12. A method for inter-site communication of data streams in a cooperative data stream processing system, the method comprising:
  identifying a plurality of distributed sites, each site comprising one or more nodes and independently hosting on the nodes jobs derived from inquiries to process continuous dynamic streams of data; and
  using a processor on one or more nodes within the plurality of distributed sites to perform the steps of:
    breaking each job into a plurality of processing elements, each processing element comprising a portion of a data stream processing application and the processing elements for a given job utilizing a data stream flow comprising the continuous dynamic streams of data that is communicated through the processing elements of that given job to mine the continuous dynamic streams of data;
    grouping the processing elements into subjobs;
    executing the subjobs on nodes comprising computing systems within two or more of the plurality of distributed sites;
    identifying tunneling processing elements in given pairs of the distributed sites containing nodes on which processing elements derived from the given job are executing, each tunnel processing element comprising an executable application compatible with the processing elements derived from the given job and executing on its distributed site to maintain the data stream flow communicated through those processing elements;
    establishing a plurality of tunnels between pairs of distributed sites by establishing for each given pair of distributed sites at least two tunnels across a network connection between a given pair of tunnel processing elements where each tunnel processing elements of the given pair is located on one of the given pair of sites to exchange the data stream flows between the tunneling processing elements and the processing elements, each tunnel associated with a given job, each pair of distributed sites sharing data streams between the processing elements associated with the processing of a job on that pair of distributed sites and each tunnel associated with one of the plurality of pairs of distributed sites by creating a distributed pan comprising definitions of required tunneling flows comprising:
  an identification of an originating site in the pair of sites and a destination site in the pair of sites;
  an identification of originating site application processing elements to be involved in data stream flow transfer and an identification of destination site application processing elements to be involved in data stream flow transfer;
  an identification of data stream flows to be exchanged through the tunnel:
  security and privacy labels associated with each data stream flow to be exchanged;
  type mappings associated with each data stream flow to be exchanged; and
  a priority associated with each data stream flow to be exchanged;
using the tunnels to route the data stream flows between each given pair of sites and through processing elements of each given job as required to process the given job by mining the continuous dynamic streams of data; and
transforming the data stream flows to compensate for heterogeneity between the pair of sites, the heterogeneity between the pair of sites comprising security, data type and data semantic differences between the pair of sites.

13. The method of claim 12, wherein:
the step of establishing the plurality of tunnels further comprises
establishing a single tunnel for each one of the plurality of distributed sites; and
the step of using the tunnels to exchange data stream flows further comprises using each single tunnel to exchange all data stream flows associated with any distributed jobs run on the pair of sites associated with that single tunnel.

14. The system of claim 12, wherein the step of establishing the tunnels between pairs of distributed sites further comprises creating a plurality of distributed plans, each distributed plan comprising a definition of one of the plurality of required tunnel flows comprising:
  an identification of an originating site in the pair of sites and a destination site in the pair of sites;
  an identification of originating site application processing elements to be involved in data stream flow transfer and an identification of destination site application processing elements to be involved in data stream flow transfer;
  an identification of data stream flows to be exchanged through the tunnel;
  security and privacy labels associated with each data stream flow to be exchanged;
  type mappings associated with each data stream flow to be exchanged; and
  a priority associated with each data stream flow to be exchanged.

15. The method of claim 14, wherein the step of establishing the plurality of tunnel paths between pairs of distributed sites further comprises:
  notifying, for each tunnel flow, the identified originating site and the identified destination site regarding the distributed plan; and
  communicating, for each tunnel flow, the definition of the tunnel flow to the originating site and the destination site.

16. The method of claim 14, wherein the step of establishing the plurality of tunnel paths between pairs of distributed sites further comprises establishing, for each tunnel path, data flow relationships between application processing elements and an originating gateway processing element running on the originating site; and application elements and a destination gateway processing element running on the destination site in accordance with the tunnel flow definitions to facilitate exchange of the data stream flows.

17. A non-transitory computer-readable medium containing a computer-readable code that when read by a computer causes the computer to perform a method for inter-site communication of data streams in a cooperative data stream processing system, the method comprising:
  identifying a plurality of distributed sites, each site comprising one or more nodes and independently hosting on the nodes jobs derived from inquiries to process continuous dynamic streams of data;
  breaking each job into a plurality of processing elements, each processing element comprising a portion of a data stream processing application and the processing elements for a given job utilizing a data stream flow comprising the continuous dynamic streams of data that is communicated through the processing elements of that given job to mine the continuous dynamic streams of data;
  grouping the processing elements into subjobs;
  executing the subjobs on nodes comprising computing systems within two or more of the plurality of distributed sites;
  identifying tunneling processing elements in a given pair of the distributed sites containing nodes on which processing elements derived from the given job are executing, each tunnel processing element comprising an executable application compatible with the processing elements derived from the given job and executing on its distributed site to maintain the data stream flow communicated through those processing elements;
  establishing at least two tunnels between the given pair of nodes, each node located on one of the distributed sites by establishing communication between the tunneling processing elements located on each node in the given pair of nodes across a network connection between the given pair of sites to exchange the data stream flow between the tunneling processing elements and the processing elements, the tunnel associated with the given job by creating a distributed plan comprising definitions of required tunneling flows comprising:
    an identification of an originating site in the pair of sites and a destination site in the pair of sites;
    an identification of originating site application processing elements to be involved in data stream flow transfer and an identification of destination site application processing elements to be involved in data stream flow transfer;
    an identification of data stream flows to be exchanged through the tunnel;
    security and privacy labels associated with each data stream flow to be exchanged;
    type mappings associated with each data stream flow to be exchanged; and
    a priority associated with each data stream flow to be exchanged;
  using the tunnel to route the data stream flow between the given pair of sites and through processing elements of the given job as required to process the given job by mining the continuous dynamic streams of data; and
  transforming the data stream flows to compensate for heterogeneity between the pair of sites, the heterogeneity between the pair of sites comprising security, data type and data semantic differences between the pair of sites.

* * * * *